US012429803B2

(12) United States Patent
Kojima

(10) Patent No.: US 12,429,803 B2
(45) Date of Patent: Sep. 30, 2025

(54) IMAGE FORMATION APPARATUS INCLUDING IMAGE FORMATION UNIT THAT FORMS GLITTER DEVELOPER IMAGE

(71) Applicant: Oki Electric Industry Co., Ltd., Tokyo (JP)

(72) Inventor: Takeshi Kojima, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 56 days.

(21) Appl. No.: 18/529,746

(22) Filed: Dec. 5, 2023

(65) Prior Publication Data

US 2024/0201625 A1 Jun. 20, 2024

(30) Foreign Application Priority Data

Dec. 19, 2022 (JP) ................................ 2022-202303

(51) Int. Cl.
*G03G 15/00* (2006.01)
*G03G 9/09* (2006.01)
*G03G 15/08* (2006.01)

(52) U.S. Cl.
CPC ....... *G03G 15/5041* (2013.01); *G03G 9/0926* (2013.01); *G03G 15/0856* (2013.01); *G03G 15/556* (2013.01); *G03G 15/6585* (2013.01)

(58) Field of Classification Search
CPC ............ G03G 15/5041; G03G 9/0926; G03G 15/556; G03G 2215/00059; G03G 15/043; G03G 15/0856; G03G 15/6582; G03G 15/6585
See application file for complete search history.

(56) References Cited

U.S. PATENT DOCUMENTS 4,845,524 A * 7/1989 Okamoto ............... G03G 13/22 399/184
6,324,356 B1 * 11/2001 Inoue ................ G03G 15/0121 358/1.9
2005/0175366 A1 * 8/2005 Hasegawa .......... G03G 15/0855 399/50

(Continued)

FOREIGN PATENT DOCUMENTS

JP 2019-113783 A 7/2019

*Primary Examiner* — Stephanie E Bloss
*Assistant Examiner* — Laura Roth
(74) *Attorney, Agent, or Firm* — METROLEX IP LAW GROUP, PLLC; Robert L. Scott, Esq.

(57) ABSTRACT

An image formation apparatus may include: a first image formation unit including a storage part and configured to form a glitter developer image; and a controller. The controller may be configured to control the first image formation unit, (i) upon forming a glitter image on a medium based on predetermined print data when a remaining amount of a glitter developer in the storage part is a first remaining amount, to form the glitter developer image with a ratio of the glitter image per unit area being a first area ratio, and (ii) upon forming the glitter image on the medium based on the predetermined print data when the remaining amount is a second remaining amount less than the first remaining amount, to form the glitter developer image with the ratio of the glitter image per unit area being a second area ratio greater than the first area ratio.

20 Claims, 11 Drawing Sheets

| DOT COUNT d | AVERAGE FI VALUE 0 | 4096k | 8602k | 11878k | LUSTER MINIMUM VALUE | LUSTER STABILITY | LUSTER EVALUATION |
|---|---|---|---|---|---|---|---|
| EXAMPLE 1 | 11.5 | 11.5 | 11.8 | 11.7 | GOOD | GOOD | GOOD |
| EXAMPLE 2 | 11.4 | 11.5 | 11.3 | 11.5 | GOOD | GOOD | GOOD |
| COMPARATIVE EXAMPLE 1 | 11.0 | 11.3 | 12.8 | 12.5 | GOOD | POOR | POOR |
| COMPARATIVE EXAMPLE 2 | 10.1 | 10.0 | 8.5 | 8.6 | POOR | POOR | POOR |
| COMPARATIVE EXAMPLE 3 | 11.0 | 10.6 | 9.8 | 9.6 | POOR | POOR | POOR |
| COMPARATIVE EXAMPLE 4 | 11.5 | 11.5 | 11.0 | 10.8 | POOR | POOR | POOR |
| COMPARATIVE EXAMPLE 5 | 11.2 | 11.4 | 11.8 | 11.7 | GOOD | POOR | POOR |
| COMPARATIVE EXAMPLE 6 | 11.1 | 11.3 | 12.8 | 12.5 | GOOD | POOR | POOR |

(56) References Cited

U.S. PATENT DOCUMENTS

| | | | | |
|---|---|---|---|---|
| 2014/0043623 | A1* | 2/2014 | Koyatsu | G03G 15/0121 358/1.1 |
| 2016/0086060 | A1* | 3/2016 | Kubo | G06K 15/1878 399/38 |
| 2016/0091816 | A1* | 3/2016 | Kochi | G03G 15/0131 399/66 |
| 2022/0066349 | A1* | 3/2022 | Kurihara | G03G 21/12 |
| 2023/0266690 | A1* | 8/2023 | Ooyoshi | G03G 9/08755 430/105 |
| 2024/0111235 | A1* | 4/2024 | Yamada | H04N 1/54 |
| 2024/0210846 | A1* | 6/2024 | Hasegawa | G03G 15/556 |
| 2025/0036059 | A1* | 1/2025 | Shimada | G03G 15/0189 |

* cited by examiner

FIG. 15

| | PRINT PATTERN | | |
|---|---|---|---|
| DOT COUNT d | 0≦d<4096k | 4096k<d≦8602k | 8602k<d≦11878k |
| EXAMPLE 1 | PT2 | PT3 | PT3 |
| EXAMPLE 2 | PT4 | PT5 | PT5 |
| COMPARATIVE EXAMPLE 1 | PT1 | PT1 | PT1 |
| COMPARATIVE EXAMPLE 2 | PT6 | PT6 | PT6 |
| COMPARATIVE EXAMPLE 3 | PT7 | PT7 | PT7 |
| COMPARATIVE EXAMPLE 4 | PT2 | PT2 | PT2 |
| COMPARATIVE EXAMPLE 5 | PT3 | PT3 | PT3 |
| COMPARATIVE EXAMPLE 6 | PT8 | PT8 | PT8 |

FIG. 16

| | AVERAGE FI VALUE | | | | LUSTER MINIMUM VALUE | LUSTER STABILITY | LUSTER EVALUATION |
|---|---|---|---|---|---|---|---|
| DOT COUNT d | 0 | 4096k | 8602k | 11878k | | | |
| EXAMPLE 1 | 11.5 | 11.5 | 11.8 | 11.7 | GOOD | GOOD | GOOD |
| EXAMPLE 2 | 11.4 | 11.5 | 11.3 | 11.5 | GOOD | GOOD | GOOD |
| COMPARATIVE EXAMPLE 1 | 11.0 | 11.3 | 12.8 | 12.5 | GOOD | POOR | POOR |
| COMPARATIVE EXAMPLE 2 | 10.1 | 10.0 | 8.5 | 8.6 | POOR | POOR | POOR |
| COMPARATIVE EXAMPLE 3 | 11.0 | 10.6 | 9.8 | 9.6 | POOR | POOR | POOR |
| COMPARATIVE EXAMPLE 4 | 11.5 | 11.5 | 11.0 | 10.8 | POOR | POOR | POOR |
| COMPARATIVE EXAMPLE 5 | 11.2 | 11.4 | 11.8 | 11.7 | GOOD | POOR | POOR |
| COMPARATIVE EXAMPLE 6 | 11.1 | 11.3 | 12.8 | 12.5 | GOOD | POOR | POOR |

IMAGE FORMATION APPARATUS INCLUDING IMAGE FORMATION UNIT THAT FORMS GLITTER DEVELOPER IMAGE

CROSS REFERENCE TO RELATED APPLICATIONS

This application claims priority based on 35 USC 119 from prior Japanese Patent Application No. 2022-202303 filed on Dec. 19, 2022, entitled "IMAGE FORMATION APPARATUS", the entire contents of which are incorporated herein by reference.

BACKGROUND

The disclosure may relate to image formation apparatuses such as an image formation apparatus that is suitably applied to an electrophotographic printer.

In a related art, an image formation apparatus (may be also referred to as a printer) is widely used which performs printing, by forming a developer image (a toner image) using a developer (or a toner) with an image formation unit based on image data supplied from a computer, an external device or the like, transferring the developer image to a medium such as paper, and then applying heat and pressure to the developer image to fix the developer image to the medium.

Among developers, for example, in order to provide a glittering property, there is a developer such as a silver developer that contains a glitter pigment such as aluminum. There is an image formation apparatus that specifies, in order to obtain a metallic luster, the weight average molecular weight of a silver developer, the size of a glitter pigment and the content of the glitter pigment in the silver developer so as to form a printed product having a high glitter (FI value) (see, for example, Patent Document 1).

Patent Document 1: Japanese Patent Application Publication No. 2019-113783

SUMMARY

However, in the image formation apparatus as described above, when a printed product including a glitter developer is printed, it may be difficult to obtain a stable metallic luster.

An object of an embodiment of the disclosure may be to provide an image formation apparatus that can stabilize the metallic luster of a printed product.

An aspect of the disclosure may be an image formation apparatus that may include: a first image formation unit including a storage part in which a glitter developer is stored and configured to form a glitter developer image with the glitter developer; and a controller configured to control an operation of the first image formation unit according to print data received. The controller is configured to: control, upon forming a glitter image on a medium based on predetermined print data when an amount of the glitter developer stored in the storage part is a first remaining amount, the first image formation unit to form the glitter developer image in which a ratio of the glitter image formed per unit area is a first area ratio; and control, upon forming the glitter image on the medium based on the predetermined print data when the amount of the glitter developer stored in the storage part is a second remaining amount less than the first remaining amount, the first image formation unit to form the glitter developer image in which the ratio of the glitter image formed per unit area is a second area ratio greater than the first area ratio.

According to the aspect described above, it is possible to obtain a printed product that can suppress an increase in metallic luster even when the remaining amount of glitter developer is decreased and has a stable metallic luster from the start of use of the glitter developer in the first image formation unit until the completion of use of the glitter developer.

Hence, according to the aspect described above, it is possible to realize an image formation apparatus that can stabilize the metallic luster of a printed product.

BRIEF DESCRIPTION OF DRAWINGS

FIG. 15 is a table indicating print patterns corresponding to dot counts in Examples and Comparative Examples;

FIG. 16 is a table indicating results of evaluation of a luster; and

DETAILED DESCRIPTION

Figure 1:
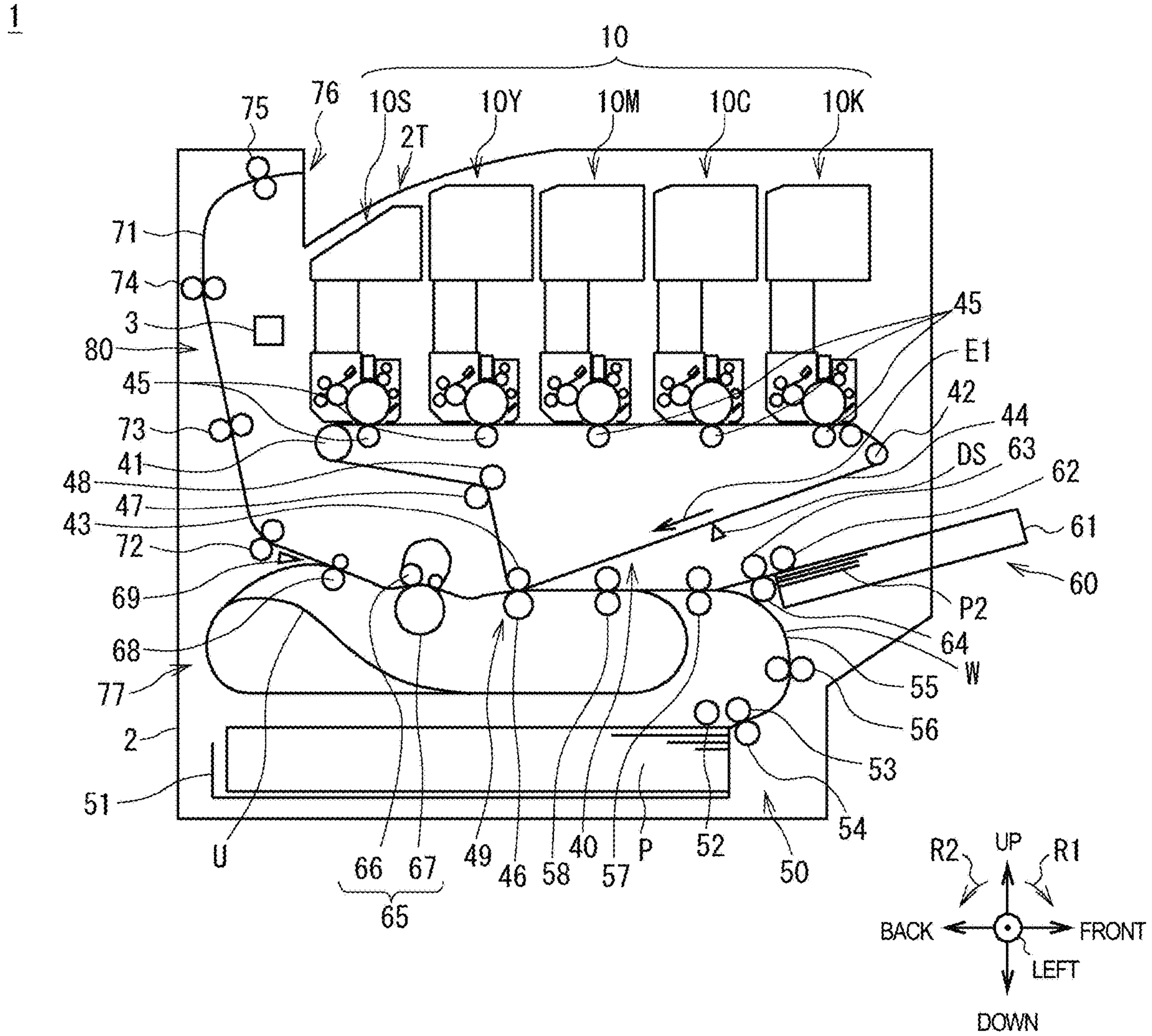
FIG. 1 is a left side view illustrating a configuration of an image formation apparatus.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

1. Configuration of Image Formation Apparatus

As illustrated in FIG. 1, an image formation apparatus 1 according to an embodiment is an electrophotographic color printer, and forms a color image on a sheet P (that is, performs printing). Incidentally, the image formation apparatus 1 does not have an image scanner function for reading an original document, a communication function using a telephone line and the like, and is an SFP (Single Function Printer) that has only a printer function.

In the image formation apparatus 1, various components are arranged inside a housing 2 that is formed substantially in the shape of a box. Incidentally, in the following description, a right end part in FIG. 1 is assumed to be the front of the image formation apparatus 1, and an up/down direction, a left/right direction and a forward/backward direction when viewed from the front are defined.

The image formation apparatus 1 is entirely controlled by a print controller 3. The print controller 3 includes a CPU (Central Processing Unit) 23 (FIG. 3), a ROM (Read Only Memory), a RAM (Random Access Memory) and the like, and reads and executes predetermined programs to perform various types of processing. The print controller 3 is connected to an external apparatus 20 (FIG. 3) such as a computer device wirelessly or by wire, and when image data indicating an image to be printed is provided from the external apparatus 20, and an instruction to print the image data is provided, the print controller 3 performs print processing for forming a print image on the surface of the sheet P.

In an upper side inside the housing 2, from a forward side toward a backward side, five image formation units 10K, 10C, 10M, 10Y and 10S are positioned in this order. Although the image formation units 10K, 10C, 10M, 10Y and 10S respectively correspond to black (K), cyan (C), magenta (M), yellow (Y) and a special color (S), they are different only in color, and are configured in the same manner. In the upper side inside the housing 2, an LED (Light Emitting Diode) head 14 (FIG. 2) is provided opposite the image formation units 10K, 10C, 10M, 10Y and 10S.

The black (K), the cyan (C), the magenta (M) and the yellow (Y) are colors (hereinafter referred to as normal colors) that are used in a general color printer. On the other hand, the special color (S) is, for example, a special color such as white, clear (transparent or colorless) or silver. For ease of description, in the following description, the image formation units 10K, 10C, 10M, 10Y and 10S are also collectively referred to as the image formation units 10.

Figure 2:
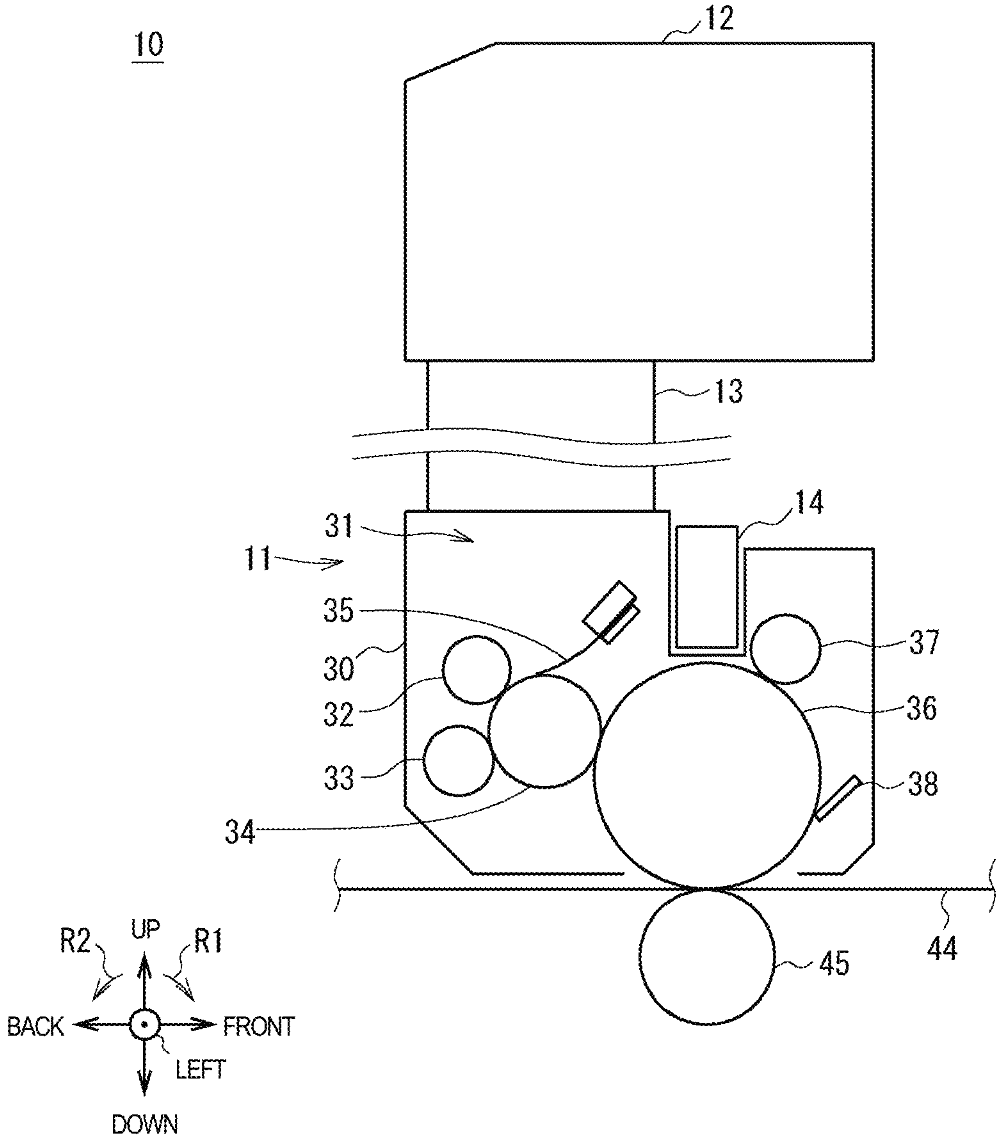
FIG. 2 is a left side view illustrating a configuration of an image formation unit.

As illustrated in FIG. 2, the image formation unit 10 is roughly divided into an image formation main body unit 11, a developer container 12 and a developer supply unit 13. Incidentally, the image formation unit 10 and the components thereof have sufficient lengths in the left/right direction according to the length of the sheet P in the left/right direction. Hence, in a large number of components, the lengths in the left/right direction are relatively longer than lengths in the forward/backward direction or the up/down direction, and the components are formed in an elongated shape along the left/right direction.

The developer container 12 stores a developer thereinside, and is configured to be detachable from the image formation unit 10. When the developer container 12 is fitted to the image formation unit 10, the developer container 12 is attached to the image formation main body unit 11 via the developer supply unit 13. Incidentally, the developer container 12 may also be referred to as a toner cartridge.

Incidentally, as a developer of silver, a developer containing a glitter pigment is used. For ease of description, in the following description, the developer of silver is also referred to as a silver developer. As the developers of yellow, magenta, cyan and black, developers containing organic pigments such as pigment yellow, pigment blue, pigment red and carbon black are used. For ease of description, in the following description, the developers of yellow, magenta, cyan and black are also collectively referred to as color developers. Furthermore, in the following description, the color developers of yellow, magenta, cyan and black are also referred to as a yellow developer, a magenta developer, a cyan developer and a black developer.

The image formation main body unit 11 (FIG. 2) incorporates an image formation housing 30, a developer storage space 31, a first supply roller 32, a second supply roller 33, a development roller 34, a development blade 35, a photosensitive drum 36, a charging roller 37 and a cleaning blade 38. Among them, each of the first supply roller 32, the second supply roller 33, the development roller 34, the photosensitive drum 36 and the charging roller 37 is formed in a cylindrical shape in which its center axis is along the left/right direction, and is rotatably supported by the image formation housing 30.

Incidentally, in the image formation unit 10S of the special color (S), the developer container 12 in which the developer of a color (such as clear color, gold or silver) previously selected by a user is stored is fitted to the image formation main body unit 11 via the developer supply unit 13.

The developer storage space 31 stores the developer that is supplied from the developer container 12 via the developer supply unit 13. On the circumferential side surface of each of the first supply roller 32 and the second supply roller 33, an elastic layer made of a conductive urethane rubber foam or the like is formed. On the circumferential side surface of the development roller 34, an elastic layer, a conductive surface layer and the like are formed. The development blade 35 is made of, for example, a stainless steel plate having a predetermined thickness, and a part thereof abuts on the circumferential side surface of the development roller 34 in a state where the development blade 35 is slightly elastically deformed.

On the circumferential side surface of the photosensitive drum 36, a charge generation layer and a charge transport layer in the shape of a thin film are sequentially formed, and thus the photosensitive drum 36 can be charged. The circumferential side surface of the charging roller 37 is coated with a conductive elastic member, and the circumferential side surface abuts on the circumferential side surface of the photosensitive drum 36. The cleaning blade 38 is made of, for example, a resin in the shape of a thin plate, and a part thereof abuts on the circumferential side surface of the photosensitive drum 36 in a state where the cleaning blade 38 is slightly elastically deformed.

The LED head 14 is located on the upper side of the photosensitive drum 36 in the image formation main body unit 11. In the LED head 14, light emitting element chips are positioned in a straight line along the left/right direction, and the light emitting elements are caused to emit light in a light emitting pattern based on image data signals supplied form the print controller 3 (FIG. 1).

A drive force is supplied from an unillustrated motor to the image formation main body unit 11, and thus the second supply roller 33, the development roller 34 and the charging roller 37 are rotated in the direction of an arrow R1 (clockwise direction in the figure), and the first supply roller 32 and the photosensitive drum 36 are rotated in the direction of an arrow R2 (counterclockwise direction in the figure). Furthermore, the image formation main body unit 11 applies, based on the control of print controller 3, a predetermined bias voltage to each of the first supply roller 32, the second supply roller 33, the development roller 34, the development blade 35 and the charging roller 37, and thus they are charged.

By charging, the developer in the developer storage space 31 is adhered to the circumferential side surfaces of the first supply roller 32 and the second supply roller 33, and by rotation, the developer is adhered to the circumferential side surface of the development roller 34. Excess developer is removed from the circumferential side surface of the development roller 34 by the development blade 35, and in a state where the developer is adhered in the shape of a thin film, the circumferential side surface described above is caused to abut on the circumferential side surface of the photosensitive drum 36.

On the other hand, in a charged state, the charging roller 37 abuts on the photosensitive drum 36 to uniformly charge the circumferential side surface of the photosensitive drum 36. The LED head 14 emits light at predetermined time intervals in the light emitting pattern based on the image data signals supplied from the print controller 3 (FIG. 1) so as to sequentially expose the photosensitive drum 36. In this way, in the photosensitive drum 36, an electrostatic latent image is sequentially formed on the circumferential side surface in the vicinity of an upper end thereof.

Then, the photosensitive drum 36 is rotated in the direction of the arrow R2, and thus the part where the electrostatic latent image is formed abuts on the development roller 34. In this way, the developer is adhered to the circumferential side surface of the photosensitive drum 36 based on the electrostatic latent image, and a developer image is developed based on the image data. The photosensitive drum 36 is further rotated in the direction of the arrow R2, and thus the developer image is made to reach the vicinity of a lower end of the photosensitive drum 36.

On the lower side of the image formation units 10 inside the housing 2 (FIG. 1), an intermediate transfer section 40 is positioned. In the intermediate transfer section 40, a drive roller 41, a driven roller 42, a backup roller 43, an intermediate transfer belt 44, primary transfer rollers 45 (five pieces), a secondary transfer roller 46 and a reverse bending roller 47 are provided. Among them, each of the drive roller 41, the driven roller 42, the backup roller 43, the primary transfer rollers 45, the secondary transfer roller 46 and the reverse bending roller 47 is formed in a cylindrical shape in which its center axis is along the left/right direction, and is rotatably supported by the housing 2.

The drive roller 41 is positioned on the lower back side of the image formation unit 10S, and when a drive force is supplied from an unillustrated belt motor, the drive roller 41 is rotated in the direction of the arrow R1. The driven roller 42 is positioned on the lower front side of the image formation unit 10K. The upper ends of the drive roller 41 and the driven roller 42 are positioned at the same height as the lower end of the photosensitive drum 36 (FIG. 2) in each of the image formation units 10 or are positioned slightly lower than the lower end thereof. The backup roller 43 is positioned on the lower front side of the drive roller 41 and the lower back side of the driven roller 42.

The intermediate transfer belt 44 is made of a high resistance plastic film as an endless belt, and is stretched to turn around the drive roller 41, the driven roller 42 and the backup roller 43. Furthermore, in the intermediate transfer section 40, the five primary transfer rollers 45 are positioned on the lower side of a part of the intermediate transfer belt 44 stretched between the drive roller 41 and the driven roller 42, that is, in the positions directly below the five image formation units 10 and opposite the photosensitive drums 36 through the intermediate transfer belt 44. The predetermined bias voltage is applied to the primary transfer rollers 45 serving as a transfer part based on the control of the print controller 3.

The secondary transfer roller 46 serving as the transfer part is positioned directly below the backup roller 43, and is biased toward the backup roller 43. In other words, in the intermediate transfer section 40, the intermediate transfer belt 44 is sandwiched between the secondary transfer roller 46 and the backup roller 43. The predetermined bias voltage is applied to the secondary transfer roller 46. In the following description, the secondary transfer roller 46 and the backup roller 43 are collectively referred to as a secondary transfer part 49.

The reverse bending roller 47 is positioned on the lower front side of the drive roller 41 and on the upper back side of the backup roller 43, and biases the intermediate transfer belt 44 in an upper forward direction. In this way, the intermediate transfer belt 44 is brought into a state where tension is applied between the rollers without causing any slack. In a position on the upper front side of the reverse bending roller 47 through the intermediate transfer belt 44, a reverse bending backup roller 48 is provided.

In the intermediate transfer section 40, the drive roller 41 is rotated in the direction of the arrow R1 by the drive force supplied from the unillustrated belt motor, and thus the intermediate transfer belt 44 is caused to travel in a direction along an arrow E1. The primary transfer rollers 45 are rotated in the direction of the arrow R1 in a state where the predetermined bias voltage is applied. In this way, in the image formation units 10, the developer images made to reach the vicinity of the lower ends on the circumferential side surfaces of the photosensitive drums 36 (FIG. 2) are transferred to the intermediate transfer belt 44, and the developer images of the individual colors are sequentially caused to overlap each other. Here, on the surface of the intermediate transfer belt 44, the developer images of the individual colors are caused to overlap each other sequentially from the silver (S) on the upstream side. In the intermediate transfer section 40, the intermediate transfer belt 44 is caused to travel, and thus the developer images transferred from the image formation units 10 are made to reach the vicinity of the backup roller 43.

Incidentally, inside the housing 2 (FIG. 1), a conveyance path W that is a path for conveying the sheet P is formed. The conveyance path W extends from the lower front side toward the upper forward direction in the housing 2, and after making about a half turn, extends backward on the lower side of the intermediate transfer section 40. Then, the conveyance path W extends upward, extends upward on the back side of the intermediate transfer section 40 and the image formation unit 10S and thereafter extends forward. In other words, in FIG. 1, the conveyance path W is formed as if to draw a capital letter “S”. Inside the housing 2, various components are positioned along the conveyance path W.

In the vicinity of a lower end inside the housing 2 (FIG. 1), a first paper feed unit 50 is positioned. In the first paper feed unit 50, a sheet cassette 51, a pickup roller 52, a feed roller 53, a retard roller 54, a conveyance guide 55, conveyance roller pairs 56 to 58 and the like are provided. Incidentally, each of the pickup roller 52, the feed roller 53, the retard roller 54 and the conveyance roller pairs 56 to 58 is formed in a cylindrical shape in which its center axis is along the left/right direction.

The sheet cassette 51 is formed in a hollow rectangular parallelepiped shape, and the sheets P are stored thereinside in a state where the sheets P are stacked with the planes of the sheets P directed in the up/down direction, that is, in an accumulated state. The sheet cassette 51 is detachable from the housing 2.

The pickup roller 52 abuts on the vicinity of the upper end of the uppermost surface of the sheets P stored in the sheet cassette 51. The feed roller 53 is positioned slightly apart in front of the pickup roller 52. The retard roller 54 is located on the lower side of the feed roller 53, and forms a gap corresponding to the thickness of one sheet P between itself and the feed roller 53.

When a drive force is supplied from an unillustrated paper feed motor, the first paper feed unit 50 rotates or stops the pickup roller 52, the feed roller 53 and the retard roller 54 as necessary. In this way, the pickup roller 52 feeds forward one sheet or sheets on the uppermost surface among the sheets P stored in the sheet cassette 51. The feed roller 53 and the retard roller 54 further feed forward one sheet on the uppermost surface among the sheets P while stopping the second and subsequent sheets. In this way, the first paper feed unit 50 feeds forward the sheets P one by one while separating the sheets P.

The conveyance guide 55 is positioned on the lower front side of the conveyance path W, and causes the sheet P to travel along the conveyance path W in the upper forward direction and to further travel in the upper backward direction. The conveyance roller pairs 56 and 57 are respectively positioned near the center of the conveyance guide 55 and in the vicinity of the upper end thereof, and are rotated in a predetermined direction when the drive force is supplied from the unillustrated paper feed motor. In this way, the conveyance roller pairs 56 and 57 cause the sheet P to travel along the conveyance path W.

On the front side of the conveyance roller pair 57 in the housing 2, a second paper feed unit 60 is provided. In the second paper feed unit 60, a sheet tray 61, a pickup roller 62, a feed roller 63, a retard roller 64 and the like are provided. The sheet tray 61 is formed in the shape of a thin plate in the up/down direction, and sheets P2 are placed on the upper side thereof. Incidentally, on the sheet tray 61, for example, the sheets P2 which are different in size and paper quality from the sheets P stored in the sheet cassette 51 are placed.

The pickup roller 62, the feed roller 63 and the retard roller 64 are configured in the same manner as the pickup roller 52, the feed roller 53 and the retard roller 54 in the first paper feed unit 50. When the drive force is supplied from the unillustrated paper feed motor, the second paper feed unit 60 rotates or stops the pickup roller 62, the feed roller 63 and the retard roller 64 as necessary. Thus, the second paper feed unit 60 feeds backward one sheet on the uppermost surface among the sheets P2 on the sheet tray 61 while stopping the second and subsequent sheets. In this way, the second paper feed unit 60 feeds backward the sheets P2 one by one while separating the sheets P2. Here, the sheet P2 fed out is conveyed by the conveyance roller pair 57 along the conveyance path W as with the sheet P. For ease of description, in the following description, the sheet P2 is simply referred to as the sheet P without being distinguished from the sheet P.

Incidentally, in the conveyance roller pair 57, the rotation is suppressed as necessary, a frictional force is applied to the sheet P and thus so-called skew in which the sides of the sheet P are inclined with respect to the direction of travel is corrected, with the result that after the leading and trailing edges of the sheet P are aligned along the left and right sides, the sheet P is fed backward. The conveyance roller pair 58 are located a predetermined distance apart from the conveyance roller pair 57, and are rotated in the same manner as the conveyance roller pair 56 and the like, and thus a drive force is supplied to the sheet P conveyed along the conveyance path W, with the result that the sheet P is caused to further travel backward along the conveyance path W.

On the back side of the conveyance roller pair 58, the secondary transfer part 49 in the intermediate transfer section 40 described above, that is, the backup roller 43 and the secondary transfer roller 46 are arranged. In the secondary transfer part 49, the developer images formed in the image formation units 10 and transferred to the intermediate transfer belt 44 are moved closer as the intermediate transfer belt 44 travels, and the predetermined bias voltage is applied to the secondary transfer roller 46. Hence, the secondary transfer part 49 transfers the developer images to the sheet P conveyed along the conveyance path W and causes the sheet P to further travel backward.

In the image formation apparatus 1, on the lower back side of the driven roller 42, a density sensor DS is provided. The density sensor DS detects the densities of the developers in the developer images transferred to the surface of the intermediate transfer belt 44, and notifies the results of the detection obtained to the print controller 3. Accordingly, the print controller 3 performs density correction for correcting the densities of the developers in the developer images of the individual colors formed in the image formation units 10, and performs feedback control on the bias voltages to the individual units and the like such that the densities of the developers are changed to desired values.

On the back side of the secondary transfer part 49, a fixation device 65 is arranged. The fixation device 65 includes a heating part 66 and a pressurizing part 67 which are positioned opposite each other through the conveyance path W. In the heating unit 66, a heater that generates heat, rollers and the like are arranged inside the heating belt of a hollow endless belt. The pressurizing part 67 is formed as a pressurizing roller in a cylindrical shape in which its center axis is along the left/right direction, and the surface on the upper side is pressed against the surface on the lower side of the heating part 66 to form a nip portion.

Based on the control of the print controller 3, the fixation device 65 heats the heater of the heating part 66 to a predetermined temperature, and rotates the rollers as necessary to cause the heating belt to travel and rotate in the direction of the arrow R1 and to cause the pressurizing part 67 to rotate in the direction of the arrow R2. Then, when the fixation device 65 receives the sheet P to which the developer images have been transferred by the secondary transfer part 49, the fixation device 65 sandwiches (that is, nips) the sheet P between the heating part 66 and the pressurizing unit 67, applies heat and pressure to fix the developer images to the sheet P and feeds the sheet P backward.

On the back side of the fixation device 65, a conveyance roller pair 68 are arranged, and on the back side thereof, a switching part 69 is arranged. The switching part 69 switches, according to the control of the print controller 3, the direction of travel of the sheet P to the upper side or to the lower side. On the upper side of the switching part 69, a paper discharge section 70 is provided. The paper discharge section 70 includes a conveyance guide 71 which guides the sheet P upward along the conveyance path W, conveyance roller pairs 72 to 75 each of which are opposite each other through the conveyance path W and the like.

On the lower side of the switching part 69, the fixation device 65, the secondary transfer part 49 and the like, a reconveyance section 77 is arranged. The reconveyance section 77 includes a conveyance guide forming a reconveyance path U, a conveyance roller pair (unillustrated) and the like. The reconveyance path U extends downward from the lower side of the switching part 69, then extends forward and thereafter merges into the conveyance path W on the downstream side of the conveyance roller pair 57.

When the sheet P is ejected, the print controller 3 uses the switching part 69 to switch the direction of travel of the sheet P to the side of the paper discharge section 70 on the upper side. The paper discharge section 70 conveys the sheet P received from the switching part 69 upward, and ejects the sheet P from a discharge port 76 to a paper discharge tray 2T. When the sheet P is returned, the print controller 3 uses the switching part 69 to switch the direction of travel of the sheet P to the side of the reconveyance section 77 on the lower side. The reconveyance section 77 conveys the sheet P received from the switching part 69 to the reconveyance path U, then causes the sheet P to reach the downstream side of the conveyance roller pair 57 and conveys the sheet P again along the conveyance path W. In this way, in the image formation apparatus 1, the sheet P is returned to the conveyance path W in a state where the plane of the sheet P is reversed, and thus so-called double-sided printing can be performed.

As described above, in the image formation apparatus 1, the developer images using the developers are formed in the image formation units 10, are transferred to the intermediate transfer belt 44, are transferred in the secondary transfer part 49 from the intermediate transfer belt 44 to the sheet P and are further fixed in the fixation device 65, with the result that the image is printed on the sheet P (that is, the image is formed). For ease of description, in the following description, the developer image formed of the silver developer (glitter developer) is also referred to as a silver developer image (glitter developer image), and the developer image formed of the color developer is also referred to as a color developer image.

For example, in the image formation apparatus 1, when the silver developer image of the silver developer and the color developer image of the color developer are sequentially transferred to the intermediate transfer belt 44 in the image formation units 10, these developer images are transferred to the sheet P in the secondary transfer part 49. In this way, in the sheet P, the color developer image is adhered to the surface of the sheet P, and the silver developer image is further superimposed on the surface of the color developer image. In other words, the color developer image is positioned between the sheet P and the silver developer image so as to be superimposed with the silver developer image.

In the following description, the color developer image formed of the black developer is also referred to as a black developer image, the color developer image formed of the yellow developer is also referred to as a yellow developer image, the color developer image formed of the magenta developer is also referred to as a magenta developer image and the color developer image formed of the cyan developer is also referred to as a cyan developer image.

Here, a developer image that is formed by using a developer with a saturation of 5 or less and a brightness of less than 20 when a measurement is made with a spectrophotometer (SE7700 made by NIPPON DENSHOKU INDUSTRIES Co., Ltd) using a C light source at an angle of 2 degrees is defined as the black developer image. In an embodiment, a developer image that is formed by using a developer with a saturation of 5 or less and a brightness of 20 or more and less than 70 is defined as a gray developer image.

Furthermore, in the following description, print processing for superimposing the silver developer image on the black developer image is referred to as glitter superimposition print processing, and a printed product obtained by the glitter superimposition print processing is also referred to as a sliver black superimposition printed product. Furthermore, in the following description, print processing for forming the black developer image and the silver developer image without the silver developer image being superimposed on the black developer image is referred to as glitter non-superimposition print processing, and a printed product obtained by the glitter non-superimposition print processing is also referred to as a sliver black non-superimposition printed product. Furthermore, in the following description, print processing using only the silver developer image is referred to as silver developer print processing, and a printed product obtained by the silver developer print processing is also referred to as a sliver printed product.

Note that in the image formation apparatus 1 is configured, by increasing the absolute value of the bias voltage applied to each of the individual units by the control of the print controller 3, to increase the amount of developer formed in the developer image transferred to the sheet P (that is, the adhered amount) (hereinafter referred to as a formed amount on the medium), whereas by decreasing the absolute value of the bias voltage by the control of the print controller 3, to reduce the formed amount on the medium. Further the image formation apparatus 1 is configured, by increasing the print image density (details of which are described later) of the developer by the control of the print controller 3, to increase the amount of developer formed in the developer image transferred to the sheet P (the formed amount on the medium), whereas by decreasing the print image density by the control of the print controller, to reduce the formed amount on the medium. Furthermore, the image formation apparatus 1 is configured, by increasing a transfer efficiency in the secondary transfer part 49 by the control of the print controller 3, increase the formed amount on the medium, whereas by decreasing the transfer efficiency by the control of the print controller 3, reduce the formed amount on the medium.

2. Control Configuration of Image Formation Apparatus

Figure 3:
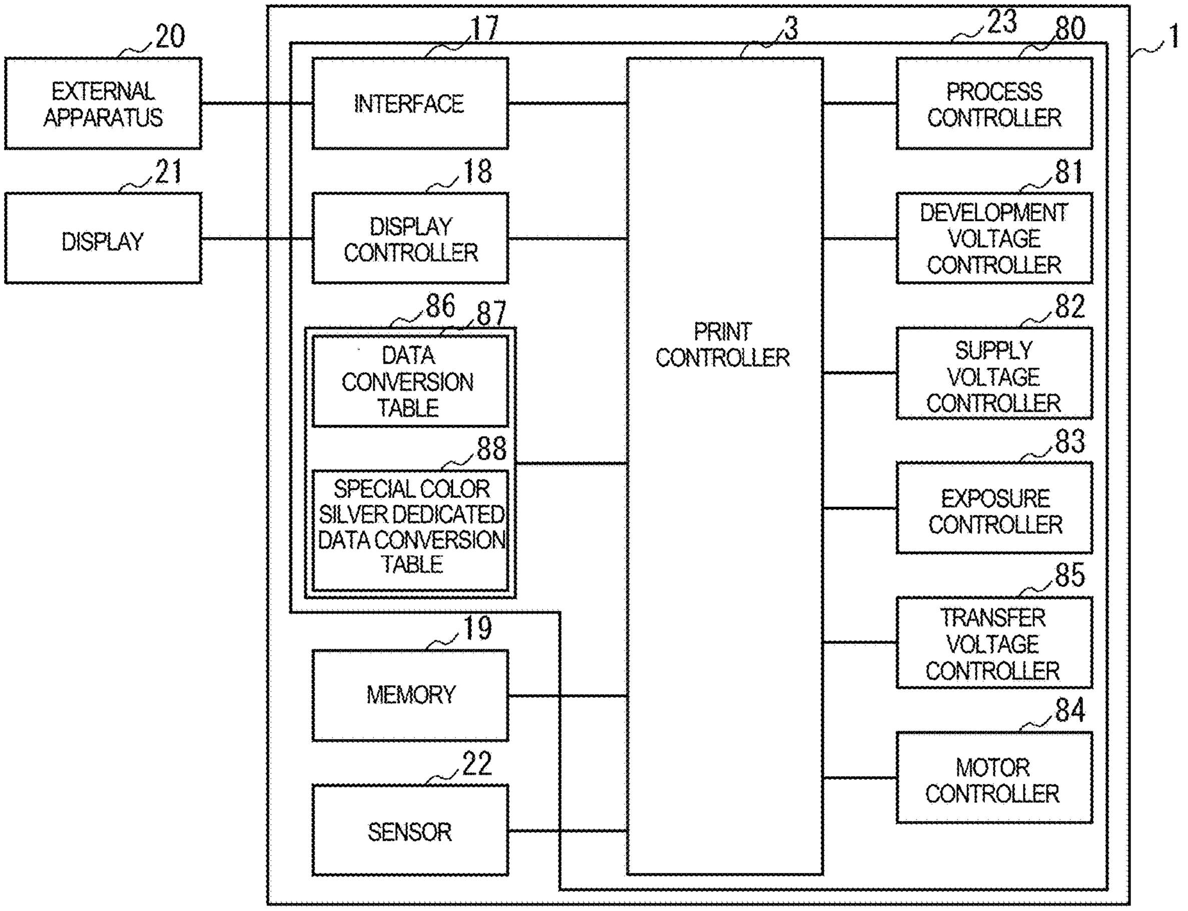
FIG. 3 is a block diagram illustrating a control configuration of the image formation apparatus.

As illustrated in FIG. 3, the image formation apparatus 1 includes the CPU 23, a memory 19 and a sensor 22. The CPU 23 includes the print controller 3, an interface (an interface unit) 17, a display controller 18, a process controller 80, a development voltage controller 81, a supply voltage controller 82, an exposure controller 83, a transfer voltage controller 84, a motor controller 85 and a data availability determination unit 86.

The print controller 3 controls the entire operation of the image formation apparatus 1. The interface 17 receives, for example, print data transmitted from the external apparatus 20 such as a computer device, and provides the print data to the print controller 3. The display controller 18 controls the display state of a display (a display device) 21 based on an instruction signal from the print controller 3.

The process controller 80 controls the voltages of the individual units such as the image formation units 10. The development voltage controller 81 controls the bias voltage of the development roller 34. The supply voltage controller 82 controls the bias voltages of the first supply roller 32, the second supply roller 33 and the development blade 35. The exposure controller 83 controls the turning on and off of the LED of the LED head 14. The transfer voltage controller 84 controls the bias voltages of the primary transfer rollers 45. The motor controller 85 rotates the photosensitive drums 36 and the like in the predetermined direction.

The data availability determination unit 86 analyzes the print data transmitted from the external apparatus 20 and received by the interface unit 17, and thereby determines whether or not image data to be printed by the image formation units 10 is present.

The data availability determination unit 86 includes a data conversion table 87. The data conversion table 87 converts the received print data into print patterns of the image formation units 10K, 10C, 10M, 10Y and 10S. When the data availability determination unit 86 receives, for example, print data of a color of red 100% in RGB output from commercially available image creation software, the data availability determination unit 86 determines, according to a conversion formula included in the data conversion table 87, that the print data is image data to be printed with magenta (M) 100% and yellow (Y) 100%.

Figure 7:
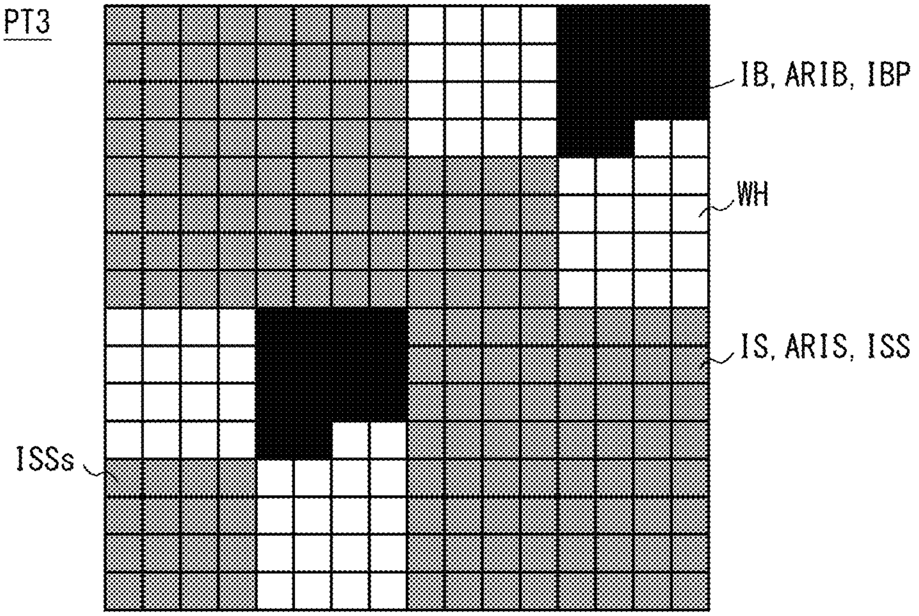
FIG. 7 is an enlarged view illustrating a print pattern PT3.
Figure 8:
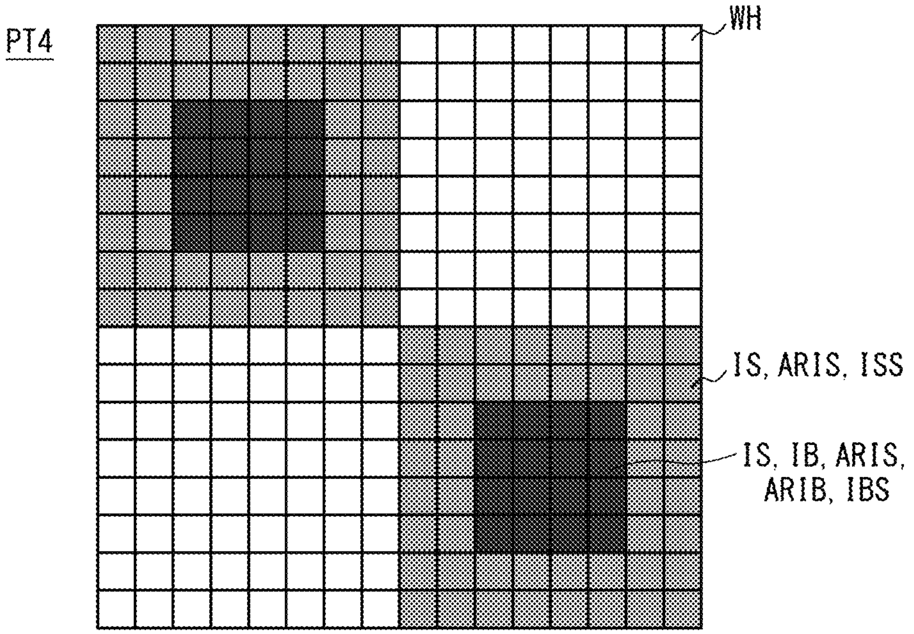
FIG. 8 is an enlarged view illustrating a print pattern PT4.
Figure 10:
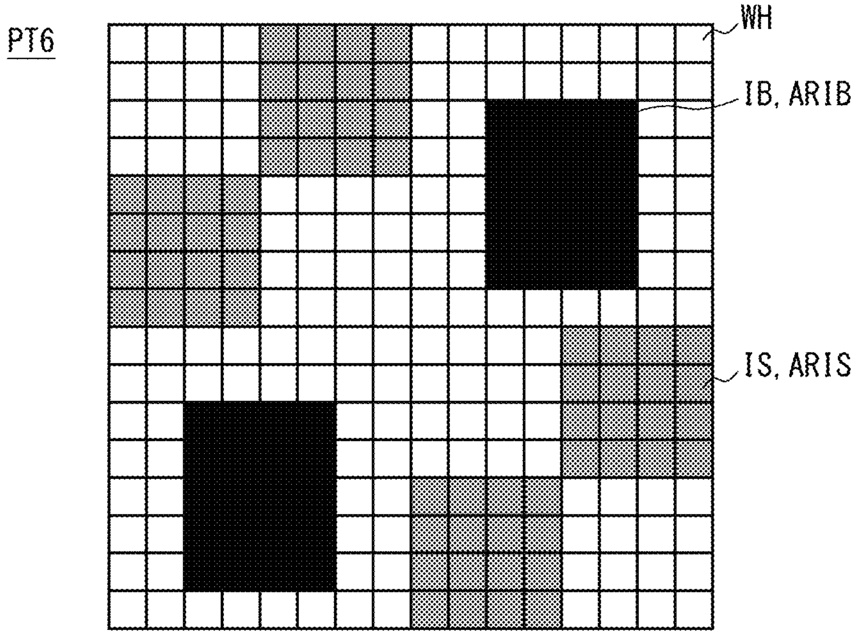
FIG. 10 is an enlarged view illustrating a print pattern PT6.
Figure 11:
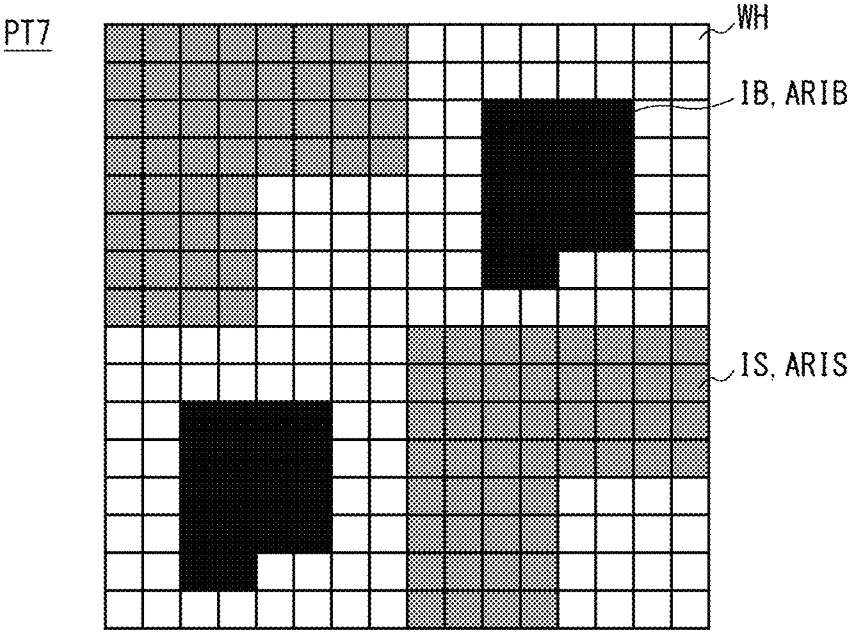
FIG. 11 is an enlarged view illustrating a print pattern PT7.

The data availability determination unit 86 further includes a special color silver dedicated data conversion table 88. The special color silver dedicated data conversion table 88 serving as a storage or a storage section is used when the print data of silver is printed, and the received print data is converted into the print patterns of the image formation units 10K and 10S. The special color silver dedicated data conversion table 88 also includes information that the dot counts of the image formation unit 10S are associated with print patterns in which a silver developer image area occupancy ratio and a black developer image area occupancy ratio (described later) are different from each other. When the data availability determination unit 86 receives, for example, print data of a color of silver 100%, the data availability determination unit 86 determines, according to the conversion formula included in the special color silver dedicated data conversion table 88 and the dot count of the image formation unit 10S, that the print data is image data to be printed with any one of a print pattern PT2 illustrated in FIG. 6, a print pattern PT3 illustrated in FIG. 7, a print pattern PT4 illustrated in FIG. 8, a print pattern PT5 illustrated in FIG. 9, a print pattern PT6 illustrated in FIG. 10, a print pattern PT7 illustrated in FIG. 11 and a print pattern PT8 illustrated in FIG. 12 using black (K) and silver (S).

The memory 19 is the ROM and the RAM described above, and stores information indicating the procedure of a printing operation and various types of information (for example, software programs) such as calculation formulae for performing various types of corrections. The memory 19 also includes, for each of the image formation units 10, a dot counter that counts the total of dots printed in the image formation unit 10 after the developer container 12 is fitted. The dot counter memorizes the total number of dots printed by the print controller 3 in each of the image formation units 10. When the print controller 3 sends the image formation unit 10S, for example, an image pattern (so-called solid image) with a print image density (details of which are described later) of 100% on the entire plane of the A4 sheet, the dot count of the image formation unit 10S is increased only by 16384 counts. The sensor 22 performs the detection of the position of the sheet P, the detection of temperature and humidity and the like.

3. Manufacturing of Developer

The manufacturing of the developer stored in the developer container 12 of the image formation unit 10 (FIG. 2) is then described. As the developers of black, yellow, magenta and cyan, commercially available developers for the image formation apparatus 1 (C941dn made by Oki Electric Industry Co., Ltd.) are used. In an embodiment, as the developer of the special color, the silver developer is used. The manufacturing of the silver developer is described below.

In general, the developer includes, in addition to a pigment for developing a desired color, a binder resin for binding this pigment to a medium such as the sheet P, an external additive for enhancing a charging property and the like. For ease of description, in the following description, particles including a pigment and a binder resin or a powdery material in which these particles are aggregated is referred to as a toner or toner particles, and a powdery material including an external additive and the like in addition to the toner is referred to as a developer. In an embodiment, since a description is given using a one-component development method, particles including a glitter pigment and a binding resin or a powdery material in which these particles are aggregated is referred to as a glitter toner or glitter toner particles, and a powdery material including an external additive and the like in addition to the glitter toner is defined as a glitter developer. However, when a description is given using a two-component development method, particles including a glitter pigment and a binding resin or a powdery material in which these particles are aggregated is referred to as a glitter toner or glitter toner particles, and a powdery material including an external additive in addition to the glitter toner is defined as a glitter developer.

In an embodiment, an aqueous medium in which an inorganic dispersant is dispersed is first generated Specifically, 600 parts by weight of industrial trisodium phosphate dodecahydrate are mixed with 18400 parts by weight of pure water and dissolved at a liquid temperature of 60° C., and then dilute nitric acid for pH (hydrogen ion index) adjustment is added, to thus obtain the aqueous solution. To this aqueous solution, a calcium chloride solution, in which 300 parts by weight of industrial calcium chloride anhydride are dissolved in 2600 parts by weight of pure water, is added, and then the solution is stirred at high speed by a line mill (from Primix Corporation) at a rotation speed of 3,566 [rpm] for 50 minutes while maintaining the liquid temperature at 60° C. In this way, an aqueous phase that is an aqueous medium in which a suspension stabilizer (inorganic dispersant) is dispersed is prepared.

In an embodiment, a material dispersion oily medium is generated. Specifically, 470 parts by weight of a glitter pigment (volume average particle diameter of 5.4 μm) and 23 parts by weight of a charge control agent (BONTRON E-84 made by ORIENT CHEMICAL INDUSTRIES CO., LTD.) are mixed with 7000 parts by weight of ethyl acetate, and thus a pigment dispersion liquid is generated. Among them, the glitter pigment contains a minute flake of aluminum (Al), that is, a small piece having a planar part formed in the shape of a flat plate, a flat portion or a scale. In the following description, this glitter pigment is also referred to as an aluminum pigment or a metal pigment. The volume average particle diameter is also referred to as a volume particle diameter, a volume median diameter or an average median diameter. Although in an embodiment, the glitter pigment having a volume average particle diameter of 5.4 μm is used, it may be preferable that the volume average particle diameter of the glitter pigment is in a range of 5.3 to 5.7 μm.

Thereafter, the pigment dispersion liquid is stirred while being maintained at a liquid temperature of 60° C., and 175 parts by weight of ester wax (WE-4 made by NOF Corporation) serving as a release agent and 1670 parts by weight of polyester resin serving as a binder resin are added, and the resulting mixture is stirred until a solid material disappears. In this way, an oil phase that is a pigment dispersion oily medium is prepared.

Then, the oil phase is put into the aqueous phase whose liquid temperature has been lowered to 55° C., and as a granulation condition, the resulting mixture is stirred at a rotation speed of 1000 [rpm] for 5 minutes so as to be suspended, with the result that particles are formed in the suspension. Then, the suspension is distilled under reduced pressure, and thus ethyl acetate is removed, with the result that a slurry including a developer is formed. Then, nitric acid is added to this slurry to cause the pH (hydrogen ion index) to be 1.6 or less, the resulting mixture is stirred and tricalcium phosphate serving as a suspension stabilizer is dissolved and dehydrated, with the result that a developer is formed. Then, the dehydrated developer is redispersed in pure water, is stirred and is washed with water. Thereafter, a dehydration step, a drying step and a classification step are performed to produce toner mother particles.

As an external addition step, 1.5 [weight %] of small silica (RY200 made by NIPPON AEROSIL CO., LTD.), 2.29 [weight %] of colloidal silica (X24-9163A made by Shin-Etsu Chemical Co., Ltd.) and 0.37 [weight %] of melamine particles (Epostar S made by NIPPON SHOKUBAI CO., LTD.) are put into and mixed with the toner mother particles generated as described above, with the result that a silver developer having a volume average particle diameter of 15.01 μm is obtained. Although in an embodiment, the silver developer having a volume average particle diameter of 15.01 μm is used, the volume average particle diameter of the silver developer is preferably in a range of 15.01±3.00 μm.

In an embodiment, the volume average particle diameter of the developer is measured using a precision particle size distribution measuring device Multisizer 3 (made by Beckman Coulter, Inc.). The measurement conditions are as follows: Aperture diameter: 100 μm. Electrolyte: Isoton II (made by Beckman Coulter, Inc.) Dispersion liquid: Neogen S-20F (made by DKS Co. Ltd.) is dissolved in the electrolyte described above such that its concentration is adjusted to be 5%. In an embodiment, 10 to 20 mg of the measurement sample is added to 5 mL of the dispersion liquid described above, the resulting mixture is dispersed using an ultrasonic disperser for 1 minute, thereafter 25 mL of the electrolyte is added, the resulting mixture is dispersed using the ultrasonic disperser for 5 minutes and an aggregate is removed through a mesh with an opening of 75 μm, with the result that a sample dispersion liquid is prepared. Furthermore, in an embodiment, this sample dispersion liquid is added to 100 mL of the electrolyte described above, 30,000 particles are measured and its distribution (that is, a volume particle size distribution) is determined using the precision particle size distribution measuring device described above, with the result that the volume average particle diameter (Dv50) is determined based on the volume particle size distribution. The volume average particle diameter (Dv50) refers to a particle diameter when in the particle size distribution of a powder, the number or mass larger than a certain particle diameter accounts for 50% of the number or mass of the entire powder. The precision particle size distribution measuring device described above measures a particle size distribution using the Coulter principle. The Coulter principle is called a pore electrical resistance method in which a constant current is passed through pores (apertures) in an electrolyte solution, a change in the electrical resistance of the pores is measured when particles pass through the pores and thus the volume of the particles is measured.

4. Print Pattern

Print patterns are then described.

[4-1. Print Pattern PT1]

Figure 4:
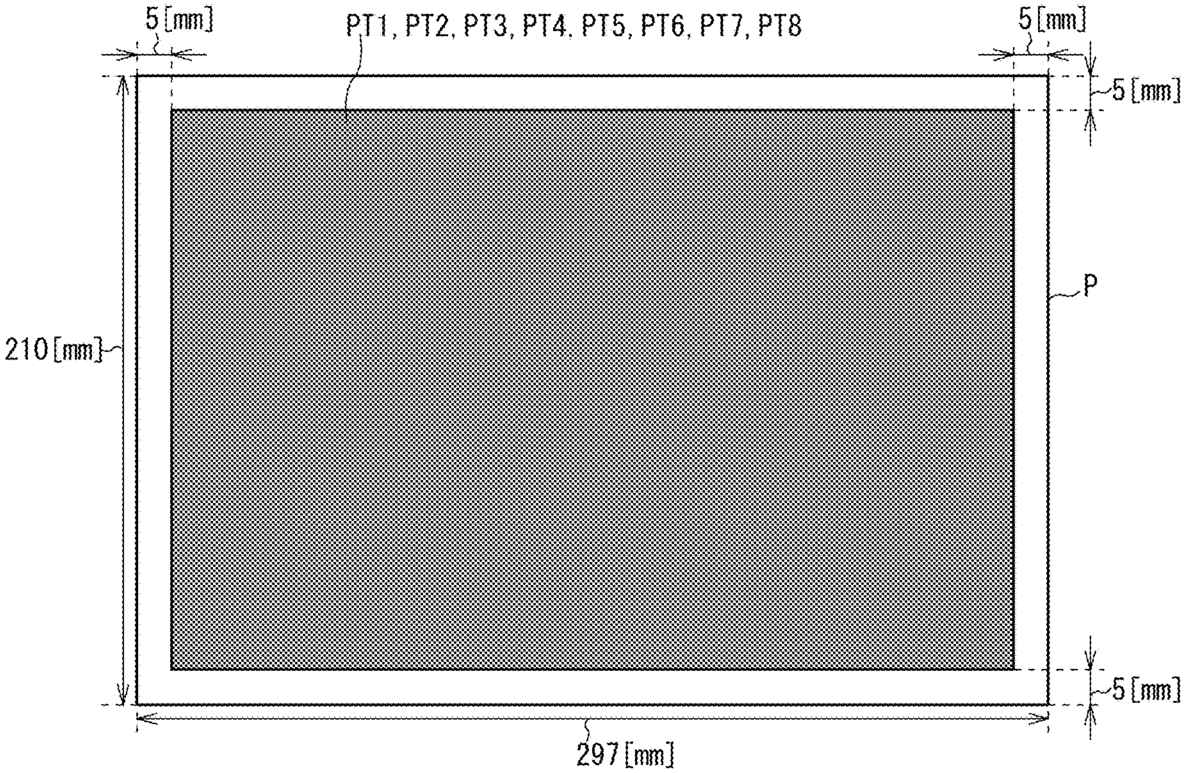
FIG. 4 is a diagram illustrating a print pattern.
Figure 5:
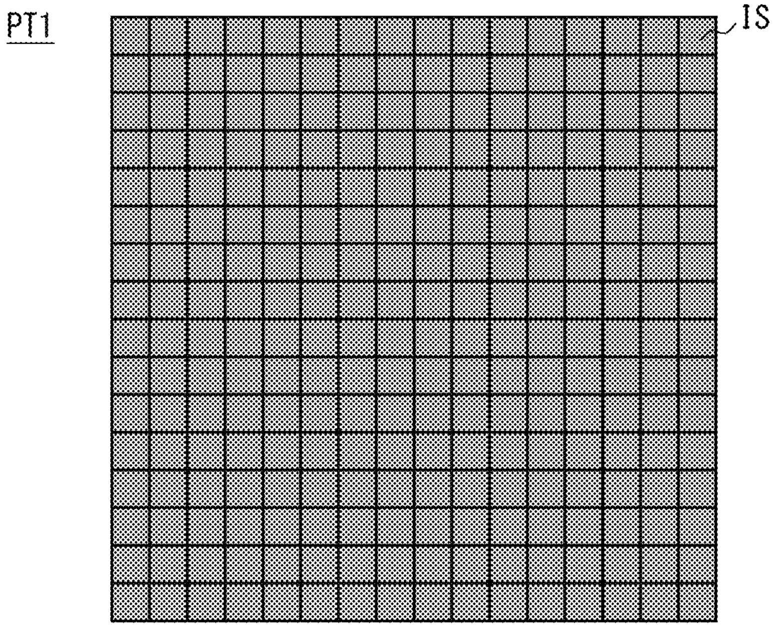
FIG. 5 is an enlarged view illustrating a print pattern PT1.

For a print pattern PT1, print data in which an image pattern (so-called solid image) with the print image density of the special color (silver) set to 100% on the entire area of the A4 sheet P is specified is transmitted from the external apparatus 20 to the image formation apparatus 1, the image formation apparatus 1 performs the silver developer print processing without using the special color silver dedicated data conversion table 88 and thus the print pattern PT1 is produced on the sheet P as illustrated in FIG. 4. In the case of the print pattern PT1, patterns same as a part of the print pattern PT1 illustrated in the enlarged view of FIG. 5 are spread over the entire area of the A4 sheet P as illustrated in FIG. 4, and thus a silver printed product is obtained.

The print pattern PT1 includes only the silver developer images IS which are formed of the silver developer. When the print pattern PT1 is seen in a range of 16×16 dots (hereinafter also referred to as a unit area), the silver developer images IS corresponding to 256 dots in all regions of 16×16 dots are formed. Here, one dot (also referred to as one pixel unit) refers to a state where the print pattern PT1 is enlarged to the minimum unit of a print command. The print pattern PT1 is formed with dots of 600 dpi, and the smallest square in FIG. 5 corresponds to one dot. Since the print pattern PT1 is of 600 dpi, the width and the height of one dot are 0.042 mm.

Since in the print pattern PT1, the silver developer images IS corresponding to 256 dots out of 256 dots are formed, the print pattern PT1 is also said to be a print pattern in which the area occupancy ratio (also referred to as a silver developer image area occupancy ratio) of the silver developer images IS is 100%. Since in the print pattern PT1, black developer images IB formed of the black developer corresponding to 0 dots out of 256 dots are formed, the print pattern PT1 is also said to be a print pattern in which the area occupancy ratio (also referred to as a black developer image area occupancy ratio) of the black developer images IB is 0%. As described above, the print pattern PT1 is a print pattern with a silver developer image area occupancy ratio of 100% and a black developer image area occupancy ratio of 0%.

[4-2. Print Pattern PT2]

For a print pattern PT2, print data in which a solid image of the special color (silver) is specified on the entire area of the A4 sheet P is transmitted from the external apparatus 20 to the image formation apparatus 1, the image formation apparatus 1 uses the special color silver dedicated data conversion table 88 to perform the glitter non-superimposition print processing and thus the print pattern PT2 is produced on the sheet P as illustrated in FIG. 4.

Figure 6:
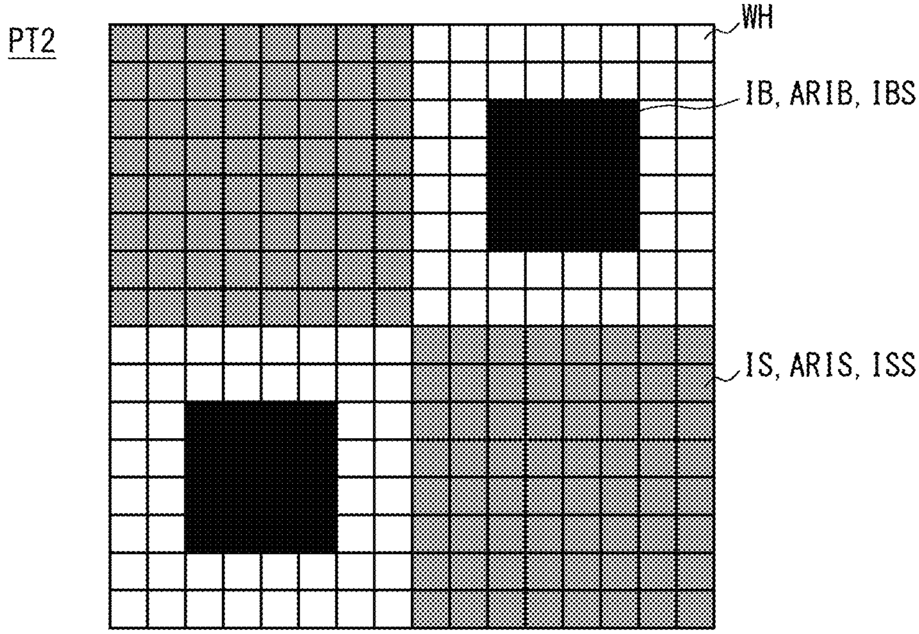
FIG. 6 is an enlarged view illustrating a print pattern PT2.

Here, the image formation apparatus 1 references the previously stored special color silver dedicated data conversion table 88 to convert print data with 100% of the special color (silver) into a command for printing the print pattern PT2 on the sheet P of FIG. 4 with the black and the special color, wherein a part, which is a range of 16×16 dots, of the print pattern PT2 is illustrated in FIG. 6. As described above, in the case of the print pattern PT2, patterns same as the part of the print pattern PT2 illustrated in FIG. 6, which is the enlarged view of the print pattern PT2, are spread over the entire area of the A4 sheet P as illustrated in FIG. 4, and thus a sliver black non-superimposition printed product is obtained.

The print pattern PT2 includes the silver developer image IS and the black developer image IB. In the following description, the region of the silver developer image IS on the plane of the sheet is referred to as a silver developer image region ARIS, and the region of the black developer image IB is referred to as a black developer image region ARIB.

In the silver developer image IS, silver developer image squares ISS in a square shape of 8×8 dots are positioned vertically and horizontally in a lattice shape at intervals of 8 dots. In the black developer image IB, a black developer image square IBS in a square shape of 4×4 dots is positioned between the silver developer image squares ISS. Between the black developer image square IBS and the silver developer image square ISS, a white region WH in which no developer image is formed is formed so as to surround the black developer image square IBS with sets of 2 dots. In other words, the black developer image square IBS is positioned with the white region WH left between the silver developer image squares ISS in a planar direction along the plane of the sheet P.

As described above, in the print pattern PT2, in a state where the white region WH is formed between the silver developer image regions ARIS in a region other than the silver developer image regions ARIS, the black developer image regions ARIB are positioned in the white region. When the print pattern PT2 is seen in a range of, for example, 16×16 dots, the silver developer image IS is formed in 128 dots corresponding to half of all the region of 16×16 dots, and in the remaining region, the black developer image IB and the white region WH are formed. Furthermore, when the print pattern PT2 is seen in a range of, for example, 16×16 dots, the silver developer image IS corresponding to 128 dots is formed, and the black developer image IB corresponding to 32 dots is formed. Hence, in the print pattern PT2, the silver developer image regions ARIS are formed to be larger than the black developer image regions ARIB. In other words, in the print pattern PT2, in the range of 16×16 dots, the silver developer image regions ARIS are larger in the ratio of the area than the black developer image regions ARIB.

Since in the print pattern PT2, the silver developer image IS corresponding to 128 dots out of 256 dots is formed, the print pattern PT2 is also said to be a print pattern with a silver developer image area occupancy ratio of 50%. Since in the print pattern PT2, the black developer image IB corresponding to 32 dots out of 256 dots is formed, the print pattern PT2 is also said to be a print pattern with a black developer image area occupancy ratio of 12.5%. As described above, the print pattern PT2 is a print pattern with a silver developer image area occupancy ratio of 50% and a black developer image area occupancy ratio of 12.5%.

[4-3. Print Pattern PT3]

For a print pattern PT3, print data in which a solid image of the special color (silver) is specified on the entire area of the A4 sheet P is transmitted from the external apparatus 20 to the image formation apparatus 1, the image formation apparatus 1 uses the special color silver dedicated data conversion table 88 to perform the glitter non-superimposition print processing and thus the print pattern PT3 is produced on the sheet P as illustrated in FIG. 4. In the case of the print pattern PT3, patterns same as a part of the print pattern PT3 illustrated in FIG. 7 (the enlarged view) are spread over the entire area of the A4 sheet P as illustrated in FIG. 4, and thus a sliver black non-superimposition printed product is obtained.

In the print pattern PT3, as compared with the print pattern PT2 (FIG. 6), two silver developer image small squares ISSs in a square shape of 4×4 dots are added to the silver developer image regions ARIS, and thus the silver developer image regions ARIS are increased by 32 dots, and in each of the black developer image squares IBS (FIG. 6), 2 bits are missed, and thus black developer image polygons IBP are formed, with the result that the black developer image regions ARIB are reduced by 4 dots.

As described above, when the print pattern PT3 is seen in a range of, for example, 16×16 dots, the silver developer image IS corresponding to 160 dots is formed, and the black developer image IB corresponding to 28 dots is formed. Hence, in the print pattern PT3, the silver developer image regions ARIS are formed to be larger than the black developer image regions ARIB. In other words, in the print pattern PT3, in the range of 16×16 dots, the silver developer image regions ARIS are larger in the ratio of the area than the black developer image regions ARIB.

Since in the print pattern PT3, the silver developer image IS corresponding to 160 dots out of 256 dots is formed, and the black developer image IB corresponding to 28 bits out of 256 dots is formed, the print pattern PT3 is a print pattern with a silver developer image area occupancy ratio of 62.5% and a black developer image area occupancy ratio of 10.9%.

[4-4. Print Pattern PT4]

For a print pattern PT4, print data in which a solid image of the special color (silver) is specified on the entire area of the A4 sheet P is transmitted from the external apparatus 20 to the image formation apparatus 1, the image formation apparatus 1 uses the special color silver dedicated data conversion table 88 to perform the glitter superimposition print processing and thus the print pattern PT4 is produced on the sheet P as illustrated in FIG. 4. In the case of the print pattern PT4, patterns same as a part of the print pattern PT4 illustrated in FIG. 8 (the enlarged view) are spread over the entire area of the A4 sheet P as illustrated in FIG. 4, and thus a sliver black superimposition printed product is obtained.

In the print pattern PT4, as compared with the print pattern PT2 (FIG. 6), the black developer image squares IBS are moved to the center parts of the silver developer image squares ISS. Hence, the entire region of the black developer image squares IBS overlaps the silver developer image squares ISS. The image formation apparatus 1 performs the glitter superimposition print processing for printing the black developer image IB that is the solid image of the black developer below the silver developer image IS that is the solid image of the silver developer, and thereby forms regions where the black developer image squares IBS overlap the silver developer image squares ISS.

As described above, in the case of the print pattern PT4, as compared with the print pattern PT2, for the print data in which the solid image of silver is specified, the image formation apparatus 1 uses the special color silver dedicated data conversion table 88 to form the silver developer image IS, the black developer image IB and the white region WH as in the print pattern PT2. However, the image formation apparatus 1 produces the print pattern PT4, that is, an arrangement pattern of the silver developer image IS, the black developer image IB and the white region WH which is different from the print pattern PT2.

Since in the print pattern PT4, as in the print pattern PT2, the silver developer image IS corresponding to 128 dots out of 256 dots is formed, and the black developer image IB corresponding to 32 bits out of 256 dots is formed, the print pattern PT4 is a print pattern with a silver developer image area occupancy ratio of 50% and a black developer image area occupancy ratio of 12.5%.

[4-5. Print Pattern PT5]

For a print pattern PT5, print data in which a solid image of the special color (silver) is specified on the entire area of the A4 sheet P is transmitted from the external apparatus 20 to the image formation apparatus 1, the image formation apparatus 1 uses the special color silver dedicated data conversion table 88 to perform the glitter superimposition print processing and thus the print pattern PT5 is produced on the sheet P as illustrated in FIG. 4. In the case of the print pattern PT5, patterns same as a part of the print pattern PT5 illustrated in FIG. 9 (the enlarged view) are spread over the entire area of the A4 sheet P as illustrated in FIG. 4, and thus a sliver black superimposition printed product is obtained.

In the print pattern PT5, as compared with the print pattern PT3 (FIG. 7), the black developer image polygons IBP are moved to the center parts of the silver developer image squares ISS. Hence, the entire region of the black developer image squares IBS overlaps the silver developer image squares ISS. The image formation apparatus 1 performs the glitter superimposition print processing to form regions where the black developer image squares IBS overlap the silver developer image squares ISS.

As described above, in the case of the print pattern PT5, as compared with the print pattern PT3, for the print data in which the solid image of silver is specified, the image formation apparatus 1 uses the special color silver dedicated data conversion table 88 to form the silver developer image IS, the black developer image IB and the white region WH as in the print pattern PT3. However, the image formation apparatus 1 produces the print pattern PT5, that is, an arrangement pattern of the silver developer image IS, the black developer image IB and the white region WH which is different from the print pattern PT3.

Since in the print pattern PT5, as in the print pattern PT3, the silver developer image IS corresponding to 160 dots out of 256 dots is formed, and the black developer image IB corresponding to 28 bits out of 256 dots is formed, the print pattern PT5 is a print pattern with a silver developer image area occupancy ratio of 62.5% and a black developer image area occupancy ratio of 10.9%.

[4-6. About Print Pattern PT6]

For a print pattern PT6, print data in which a solid image of the special color (silver) is specified on the entire area of the A4 sheet P is transmitted from the external apparatus 20 to the image formation apparatus 1, the image formation apparatus 1 uses the special color silver dedicated data conversion table 88 to perform the glitter non-superimposition print processing and thus the print pattern PT6 is produced on the sheet P as illustrated in FIG. 4. In the case of the print pattern PT6, patterns same as a part of the print pattern PT6 illustrated in FIG. 10 (the enlarged view) are spread over the entire area of the A4 sheet P as illustrated in FIG. 4, and thus a sliver black non-superimposition printed product is obtained.

Since in the print pattern PT6, the silver developer image IS corresponding to 64 dots out of 256 dots is formed, and the black developer image IB corresponding to 40 bits out of 256 dots is formed, the print pattern PT6 is a print pattern with a silver developer image area occupancy ratio of 25% and a black developer image area occupancy ratio of 15.6%.

[4-7. Print Pattern PT7]

For a print pattern PT7, print data in which a solid image of the special color (silver) is specified on the entire area of the A4 sheet P is transmitted from the external apparatus 20 to the image formation apparatus 1, the image formation apparatus 1 uses the special color silver dedicated data conversion table 88 to perform the glitter non-superimposition print processing and thus the print pattern PT7 is produced on the sheet P as illustrated in FIG. 4. In the case of the print pattern PT7, patterns same as a part of the print pattern PT7 illustrated in FIG. 11 (the enlarged view) are spread over the entire area of the A4 sheet P as illustrated in FIG. 4, and thus a sliver black non-superimposition printed product is obtained.

Since in the print pattern PT7, the silver developer image IS corresponding to 96 dots out of 256 dots is formed, and the black developer image IB corresponding to 36 bits out of 256 dots is formed, the print pattern PT7 is a print pattern with a silver developer image area occupancy ratio of 37.5% and a black developer image area occupancy ratio of 14.1%.

[4-8. Print Pattern PT8]

For a print pattern PT8, print data in which a solid image of the special color (silver) is specified on the entire area of the A4 sheet P is transmitted from the external apparatus 20 to the image formation apparatus 1, the image formation apparatus 1 uses the special color silver dedicated data conversion table 88 to perform the glitter non-superimposition print processing and thus the print pattern PT8 is produced on the sheet P as illustrated in FIG. 4. In the case of the print pattern PT8, patterns same as a part of the print pattern PT8 illustrated in FIG. 12 (the enlarged view) are spread over the entire area of the A4 sheet P as illustrated in FIG. 4, and thus a sliver black non-superimposition printed product is obtained.

Since in the print pattern PT8, the silver developer image IS corresponding to 192 dots out of 256 dots is formed, and the black developer image IB corresponding to 24 bits out of 256 dots is formed, the print pattern PT8 is a print pattern with a silver developer image area occupancy ratio of 75% and a black developer image area occupancy ratio of 9.4%.

[4-9. Print Image Density]

Here, the print image density refers to a value that indicates, when an image is decomposed pixel by pixel, a ratio of the number of pixels in which a developer is transferred to the sheet P to the total number of pixels. For example, printing with an area ratio of 100% when full-surface solid printing is performed in a printable range of a predetermined region (such as a region corresponding to one revolution of the photosensitive drum 36 or a region corresponding to one page of a print medium) refers to a print image density of 100%, and printing corresponding to an area of 1% relative to the print image density of 100% refers to a print image density of 1%. When a print image density DPD is represented by a formula using the number of used dots Cm, the number of revolutions Cd and the total number of dots CO, the print image density DPD can be represented by formula (1) below.

[Formula 1]

$$DPD = Cm/(Cd \times CO) \times 100\% \quad (1)$$

Note that the number of used dots Cm is the number of used dots actually used to form an image while the photosensitive drum 36 is being rotated Cd revolutions, and the number of used dots Cm is the total number of dots exposed by the LED head 14 (FIG. 2) during the formation of the image. The total number of dots CO is the total number of dots per revolution of the photosensitive drum 36 (FIG. 2), that is, the total number of dots which can be used while the photosensitive drum 36 is being rotated one revolution or can be potentially used for forming an image regardless of whether exposure is performed. In other words, the total number of dots CO is the total value of the number of used dots when a solid image in which a developer is transferred to all pixels is formed. Hence, the value (Cd×CO) represents the total value of the number of dots that can be potentially used for forming an image.

5. Measurement and Evaluation of Developer

[5-1. Measurement of Developer]

The measurement and the evaluation of a developer are then described. In the measurement and the evaluation of the developer, the image formation apparatus 1 (FIG. 1) uses the developer to print a predetermined image on the sheet P, and the measurement and the evaluation of a luster are performed.

In the evaluation, in the image formation apparatus 1 (C941dn made by Oki Electric Industry Co., Ltd.) (FIG. 1), the silver developer is stored in the developer container 12 (FIG. 2) of the image formation unit 10S corresponding to the special color, and the black developer is stored in the developer container 12 (FIG. 2) of the image formation unit 10K corresponding to black. Then, print processing in Example 1, Example 2, Comparative Example 1, Comparative Example 2, Comparative Example 3, Comparative Example 4, Comparative Example 5 and Comparative Example 6 is performed, and the evaluation of a luster is performed.

Specifically, in the evaluation, as the sheet P, coated paper (OS coated paper W 127 [g/m2] made by Fuji Xerox Co., Ltd.) is used. In the evaluation, printing is performed by adjusting the bias voltage in the image formation unit 10S such that the luminous reflectance difference ΔY (described later) of the silver developer image IS is 33 when an image pattern (so-called solid image) with the print image density of silver set to 100% is printed on the entire area of the A4 sheet P as illustrated in FIG. 4 with the print pattern PT1 (FIG. 5). Furthermore, in the evaluation, likewise for black, printing is performed by adjusting the bias voltage in an image formation unit 10B such that the optical density (O.D. value) of the black developer image IB is 1.4 when an image pattern (so-called solid image) with the print image density of black set to 100% is printed on the entire area of the A4 sheet P.

In the Examples and the Comparative Examples, print data in which a solid image of silver is specified on the entire area of the A4 sheet P is transmitted from the external apparatus 20 to the image formation apparatus 1, and as illustrated in FIG. 15, the image formation apparatus 1 prints a different print pattern for each of the Examples and the Comparative Examples. As illustrated in FIG. 15, the Examples and the Comparative Examples differ in into which one of the print patterns PT1 to PT8 the print data in which the solid image of silver is specified is converted by the image formation apparatus 1 according to the value of the dot count d of the image formation unit 10S. In the following description, print patterns PT1, PT2, PT3, PT4, PT5, PT6, PT7 and PT8 are collectively referred to as print patterns PT.

In the print patterns PT1 to PT8, the output of each dot is controlled by the LED head 14 (FIG. 2) to be an on state or an off state, and in the bit in the on state, the developer is developed whereas in the bit in the off state, the developer is not developed.

Figure 12:
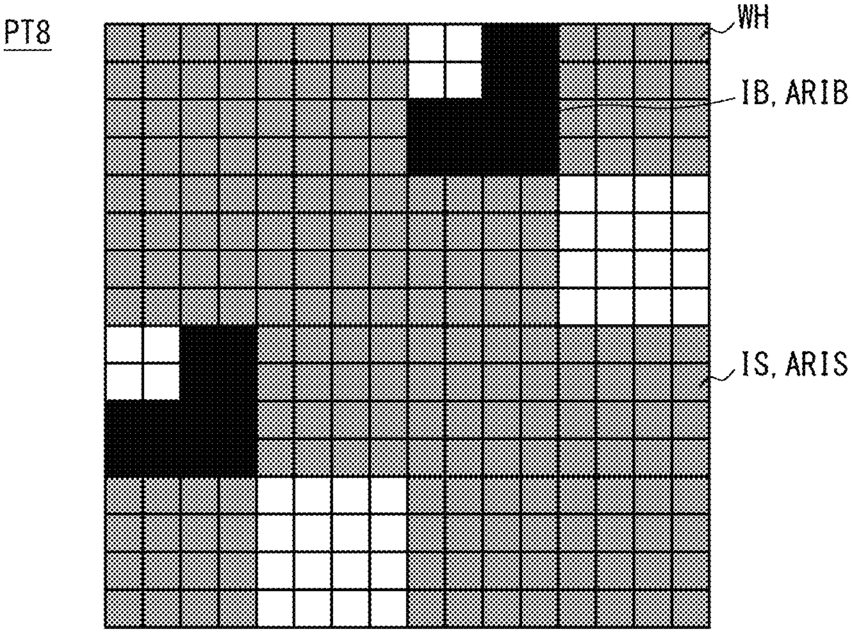
FIG. 12 is an enlarged view illustrating a print pattern PT8.

As described above, when the image formation apparatus 1 receives the print data in which the solid image of silver is specified in the image creation software from the external apparatus 20, if the special color silver dedicated data conversion table 88 is not used, the image formation apparatus 1 performs printing with a print pattern of only the silver developer image IS as in the print pattern PT1 (FIG. 5) whereas if the special color silver dedicated data conversion table 88 is used, the image formation apparatus 1 performs printing with the print pattern PT using the silver developer image IS and the black developer image IB as in the print pattern PT2 (FIG. 6), the print pattern PT3 (FIG. 7), the print pattern PT4 (FIG. 8), the print pattern PT5 (FIG. 9), the print pattern PT6 (FIG. 10), the print pattern PT7 (FIG. 11) or the print pattern PT8 (FIG. 12).

For example, in Example 1, when the dot count d of the image formation unit 10S is equal to or greater than 0 and less than 4096 k (kilo) counts (that is, 4096000 counts), the print pattern PT2 (FIG. 6) is used, when the dot count d of the image formation unit 10S is equal to or greater than 4096 k counts and less than 8602 k counts (that is, 8602000 counts), the print pattern PT3 (FIG. 7) is used and when the dot count d of the image formation unit 10S is equal to or greater than 8602 k counts and less than 11878 k counts (that is, 11878000 counts), the print pattern PT3 (FIG. 7) is used. As described above, Example 1 is characterized in that the print pattern PT is changed from the print pattern PT2 to the print pattern PT3 when the dot count d of the image formation unit 10S is increased.

Although in Example 2, as in Example 1, the print pattern PT is changed depending on the dot count d of the image formation unit 10S, the print pattern PT is different, and the silver developer image IS overlaps the black developer image IB. In Comparative Example 1, regardless of the dot count d of the image formation unit 10S, printing is performed with only the print pattern PT1 in which only the silver developer image IS is formed, and the printing is the same as normal color printing. In each of Comparative Examples 2 to 6, regardless of the dot count d of the image formation unit 10S, printing is performed with the same print pattern PT, and a ratio between the silver developer image IS and the black developer image IB relative to the print pattern PT is different for each of the Comparative Examples.

[5-2. Printed Product Acquisition Procedure]

Here, a description is given of a procedure for acquiring a printed product that is used in the evaluation described later.

Procedure 1. By the image formation apparatus 1 (C941dn made by Oki Electric Industry Co., Ltd.) in a state where the dot count d of the image formation unit 10S is 0, based on the print data in which the solid image of silver is specified on the entire area of the A4 sheet P, the solid image (FIG. 4) in which the print pattern PT specified in each of the Examples and the Comparative Examples are spread over the entire area of the A4 sheet P is printed on one sheet P for each of the print patterns PT.

Procedure 2. The luster of the printed product that is acquired is measured.

Procedure 3. By the image formation apparatus 1, based on the print data in which the solid image of silver is specified on the entire area of the A4 sheet P, the solid image (FIG. 4) in which the print pattern PT specified in each of the Examples and the Comparative Examples are spread over the entire area of the A4 sheet P is printed on a predetermined number of sheets P for each of the print pattern PT, and the dot count d of the image formation unit 10S is made to reach 4096 k counts. Specifically, the image formation apparatus 1 prints the numbers of sheets P mentioned below.

Example 1: 500 sheets, Example 2: 500 sheets, Comparative Example 1: 250 sheets, Comparative Example 2: 1000 sheets, Comparative Example 3: 667 sheets, Comparative Example 4: 500 sheets, Comparative Example 5: 400 sheets and Comparative Example 6: 334 sheets.

The reason why the numbers of sheets printed are different depending on the Examples and the Comparative Examples is that since the details of the special color silver dedicated data conversion table 88 are different for each of the Examples and the Comparative Examples, the dot count d of the image formation unit 10S in one sheet P is different.

Procedure 4. By the image formation apparatus 1 in a state where the dot count d of the image formation unit 10S is 4096 k counts, based on the print data in which the solid image of silver is specified on the entire area of the A4 sheet P, the solid image (FIG. 4) in which the print pattern PT specified in each of the Examples and the Comparative Examples are spread over the entire area of the A4 sheet P is printed on one sheet P for each of the print patterns PT.

Procedure 5. The luster of the printed product that is acquired is measured.

Procedure 6. By the image formation apparatus 1, based on the print data in which the solid image of silver is specified on the entire area of the A4 sheet P, the solid image (FIG. 4) in which the print pattern PT specified in each of the Examples and the Comparative Examples are spread over the entire area of the A4 sheet P is printed on a predetermined number of sheets P for each of the print patterns PT, and the dot count d of the Image formation unit 10S is made to reach 8602 k counts. Specifically, the image formation apparatus 1 prints the numbers of sheets P mentioned below.

Example 1: 550 sheets, Example 2: 550 sheets, Comparative Example 1: 275 sheets, Comparative Example 2: 1100 sheets, Comparative Example 3: 734 sheets, Comparative Example 4: 550 sheets, Comparative Example 5: 440 sheets and Comparative Example 6: 367 sheets.

Procedure 7. By the image formation apparatus 1 in a state where the dot count d of the image formation unit 10S is 8602 k counts, based on the print data in which the solid image of silver is specified on the entire area of the A4 sheet P, the solid image (FIG. 4) in which the print pattern PT specified in each of the Examples and the Comparative Examples are spread over the entire area of the A4 sheet P is printed on one sheet P for each of the print patterns PT.

Procedure 8. The luster of the printed product that is acquired is measured.

Procedure 9. By the image formation apparatus 1, based on the print data in which the solid image of silver is specified on the entire area of the A4 sheet P, the solid image (FIG. 4) in which the print pattern PT specified in each of the Examples and the Comparative Examples are spread over the entire area of the A4 sheet P is printed on a predetermined number of sheets P for each of the print patterns PT, and the dot count d of the Image formation unit 10S is made to reach 11878 k counts. Specifically, the image formation apparatus 1 prints the numbers of sheets P mentioned below.

Example 1: 400 sheets, Example 2: 400 sheets, Comparative Example 1: 200 sheets, Comparative Example 2: 800 sheets, Comparative Example 3: 534 sheets, Comparative Example 4: 400 sheets, Comparative Example 5: 320 sheets and Comparative Example 6: 267 sheets.

Procedure 10. By the image formation apparatus 1 in a state where the dot count d of the image formation unit 10S is 11878 k counts, based on the print data in which the solid image of silver is specified on the entire area of the A4 sheet P, the solid image (FIG. 4) in which the print pattern PT specified in each of the Examples and the Comparative Examples are spread over the entire area of the A4 sheet P is printed on one sheet P for each of the print patterns PT.

Procedure 11. The luster of the printed product that is acquired is measured. Although the evaluation is completed when the dot count d reaches 11878 k counts, this is because the developer in the developer storage space 31 of the image formation unit 10S runs out, and the count at which the developer in the image formation unit 10S also runs out is reached.

[5-3. Measurement of Hue]

In this measurement, using a spectrophotometer (CM-2600d, measuring meter φ=8 mm: made by KONICA MINOLTA, INC.), a luminous reflectance difference ΔY is measured as a measurement value that indicates a silver hue (grayness) on the plane of the sheet. The luminous reflectance difference ΔY refers to a difference between the luminous reflectance of a blank sheet and the luminous reflectance of a print image. Specifically, the luminous reflectance difference ΔY is measured by subtracting the luminous reflectance of a medium before printing from the luminous reflectance of the medium after printing. As the underlay of a printed product during the measurement, coated paper (OS coated paper W·127 g/m2 made by Fuji Xerox Co., Ltd.) serving as the medium before printing is used. As a light source condition, C is used, as an angle, 2 degrees is used and as a specular reflection light processing method, SCE is used.

Here, as the characteristic of the silver developer, the silver developer can show not only its own glitter in the printed product but also its own grayness as a color tone. However, for the grayness, when the luminous reflectance difference ΔY is excessively low so as to be less than 30, that is, when the color tone is similar to the original medium, the gray color tone disappears, and thus the grayness cannot be shown. On the other hand, when the luminous reflectance difference ΔY is excessively high so as to exceed 36, the color is excessively dark, and thus a black color tone is strong, with the result that the grayness cannot be likewise show. Hence, in this evaluation, when the luminous reflectance difference ΔY is equal to or greater than 30 and equal to or less than 36, it is considered that the grayness of the silver developer after printing can be shown. Therefore, the luminous reflectance difference ΔY at one measurement part in the center of the sheet P is measured, and the bias voltage in the image formation unit 10S is adjusted such that the luminous reflectance difference ΔY is 33, which is equal to or greater than 30 and equal to or less than 36.

[5-4. Measurement of Density]

In this measurement, using a spectrophotometer (X-Rite exact made by X-Rite, Incorporated.), a light source is set to D50, an angle is set to 2 degrees, a status is set to status I, as a measurement value indicating the hue of black on the plane of the sheet, the optical density (O.D. value) of the black developer image IB at one part in the center of the A4 sheet P is measured and the bias voltage in the image formation unit 10S is adjusted such that the optical density is 1.4.

[5-5. Measurement and Evaluation of Luster]

Then, in this evaluation, a glittering property is measured using a variable angle photometer (GC-5000L made by NIPPON DENSHOKU INDUSTRIES Co., Ltd).

Figure 13:
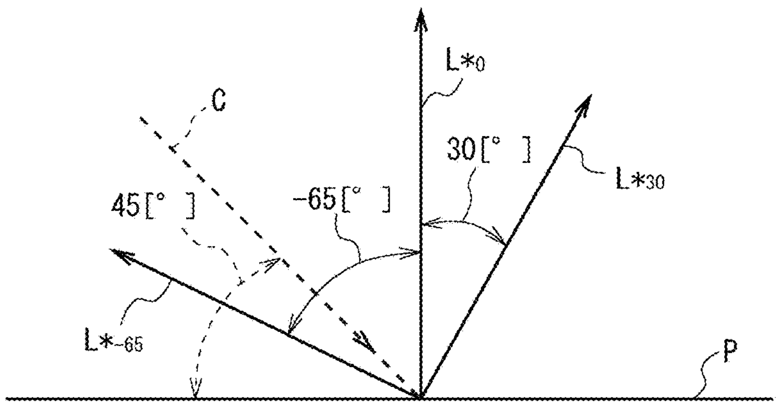
FIG. 13 is a diagram illustrating the emission of light and the reception of light performed by a variable angle photometer.

Specifically, as illustrated in FIG. 13, using the variable angle photometer, a light beam C is emitted from a direction of 45 degrees relative to the surface of the sheet P to the sheet P, reflected light is individually received in a direction of 0 degrees, in a direction of 30 degrees and in a direction of −65 degrees and based on the results of the light reception obtained, a brightness index L*0, a brightness index L*30 and a brightness index L*−65 are calculated. Then, in this evaluation, the calculated brightness indices are substituted into formula (2) below, thus a flop index FI is calculated and thus the glitter of the image is measured.

[Formula 2]

$$FI = 2.69 \times (L*_{30} - L*_{-65})^{1.11}/(L*_{0})^{0.86} \quad (2)$$

The flop index FI (FI value) is an index that indicates a luster, and as the value is higher, the glitter is higher whereas as the value is lower, the glitter is lower. Here, when the FI value is equal to or greater than 11.0, it visually appears that the printed product has a metallic luster. Hence, in this evaluation, when the FI value is equal to or greater than 11.0, it is considered that a sufficient glitter is obtained.

Figure 14:
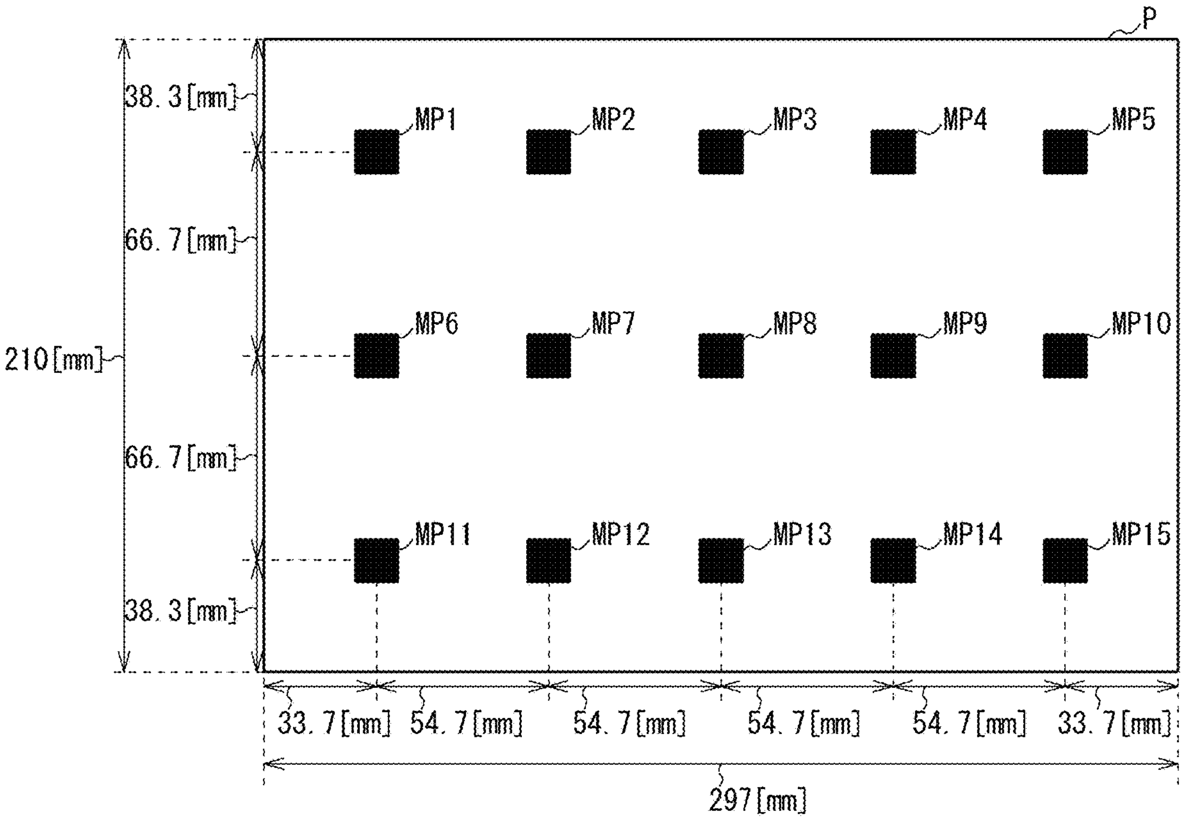
FIG. 14 is a diagram illustrating measurement parts.

Therefore, as illustrated in FIG. 14, the FI values of fifteen 5 mm-square measurement parts MP1, MP2, MP3, MP4, MP5, MP6, MP7, MP8, MP9, MP10, MP11, MP12, MP13, MP14 and MP15 (hereinafter also collectively referred to as measurement parts MP) that are set in the entire region of the A4 sheet P are measured, the average value is calculated and when an average FI value (hereinafter also simply referred to as the FI value) that is the average value of the FI values is equal to or greater than 11.0, it is determined that a satisfactory luster is obtained.

In the printed products obtained in the Examples and the Comparative Examples, when among the average FI values at a dot count d of 0, at a dot count d of 4096 k, at a dot count d of 8602 k and at a dot count d of 11878 k, the lowest average FI value is equal to or greater than 11.0, the minimum value of the luster is assumed to be satisfactory.

Then, when a difference between the FI values of two printed products is equal to or less than 0.3, it does not appear that there is a difference in luster. Hence, in the printed products obtained in the Examples and the Comparative Examples, when among the average FI values at a dot count d of 0, at a dot count d of 4096 k, at a dot count d of 8602 k and at a dot count d of 11878 k, a difference between the maximum value and the minimum value is equal to or less than 0.3, the stability of the luster is assumed to be satisfactory. When both the minimum value of the luster and the stability of the luster are satisfactory, the evaluation of the luster is determined to be satisfactory.

6. Measurement Results and Evaluation Results

The results of the evaluation tests for confirming the effects of the Examples and effects that are found from the results are described below.

As illustrated in FIG. 16, in Examples 1 and 2 and Comparative Examples 1, 5 and 6, at all the four dot counts d, the average FI values are equal to or greater than 11.0, and thus the minimum value of the luster is satisfactory. As illustrated in FIG. 16, at a dot count d of 0 and at a dot count d of 4096 k, in the print pattern PT2 (FIG. 6) (a silver developer image area occupancy ratio of 50% and a black developer image area occupancy ratio of 12.5%), the highest FI value is obtained. On the other hand, at a dot count d of 8602 k and at a dot count d of 11878 k, in the print pattern PT8 (FIG. 12) (a silver developer image area occupancy ratio of 75% and a black developer image area occupancy ratio of 9.4%), the highest FI value is obtained. As described above, the print pattern PT having the highest FI value differs depending on the dot count d.

As illustrated in FIG. 16, in Examples 1 and 2, among the average FI values at all the four dot counts d, the difference between the maximum value and the minimum value is equal to or less than 0.3, and thus the stability of the luster is satisfactory. This is considered to be because the print patterns PT are changed suitably for the silver developer the state of which is changed with the dot count d and thus it is possible to stabilize the luster.

It is found from the results described above that in the image formation apparatus 1, printing is performed by the method of Example 1 or 2, the printed product is obtained which has the stable metallic luster (FI value) and the stable color tone (the grayness, the density and the luminous reflectance difference ΔY) from the start of use of the silver developer in the image formation unit 10S (that is, in the beginning of printing) until the completion of the silver developer (that is, the end of printing).

7. Functional Configuration of Image Formation Apparatus

Figure 17:
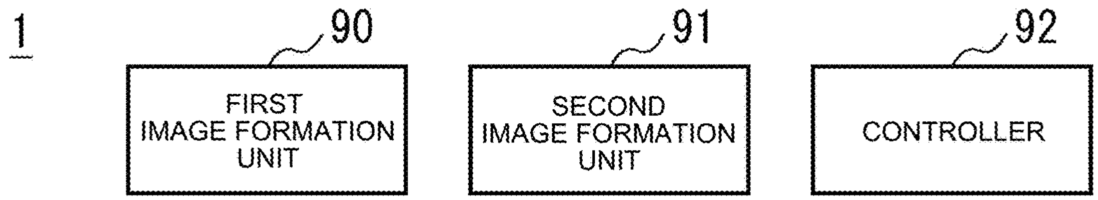
FIG. 17 is a block diagram illustrating the functional configuration of the image formation apparatus.

Here, when basic functions related to the print processing in the image formation apparatus 1 are illustrated by a functional block diagram, the functional block diagram is as illustrated in FIG. 17.

A first image formation unit 90 (a first image formation part, or a first image formation section) corresponds to the image formation unit 10S (FIG. 1), includes the developer storage space 31 (FIG. 2) as a storage part in which the silver developer serving as the glitter developer is stored and can form the silver developer image IS serving as the glitter developer image with the silver developer.

A second image formation unit 91 (a second image formation part, or a second image formation section) corresponds to the image formation unit 10K (FIG. 1), and can form the black developer image IB serving as the black developer image.

A controller 92 corresponds to the print controller 3 (FIG. 3), controls the operation of the first image formation unit 90 according to print data which is received. The controller 92 forms, when a glitter image is formed on the sheet P serving as a medium based on predetermined print data with an amount of silver developer stored in the storage part being a first remaining amount, the silver developer image IS in which a ratio of the glitter image formed per unit area is a first area ratio. The controller 92 forms, when the glitter image is formed on the sheet P based on the predetermined print data with the amount of silver developer stored in the storage part being a second remaining amount less than the first remaining amount, the silver developer image IS in which the ratio of the glitter image formed per unit area is a second area ratio greater than the first area ratio. Here, the glitter image is not an image that includes only a region where no silver developer is present on the sheet P but an image that includes a region where at least the glitter developer (silver developer) is present on the sheet P.

8. Effects and the Like

Here, as a silver developer formed amount on the medium that is the formed amount on the medium of the silver developer on the sheet P is lower, the FI value is higher but the luminous reflectance difference ΔY is lower. On the other hand, as the silver developer formed amount on the medium on the sheet P is higher, the luminous reflectance difference ΔY is higher but the FI value is lower. As described above, although in order to enhance the luminous reflectance difference ΔY, the silver developer formed amount on the medium on the sheet P is preferably increased, as the silver developer formed amount on the medium is increased, the FI value is decreased. In other words, the FI value and the luminous reflectance difference ΔY are in a trade-off relationship, and thus it is difficult to achieve both a high glitter (FI value) and a high luminous reflectance difference ΔY.

Figure 9:
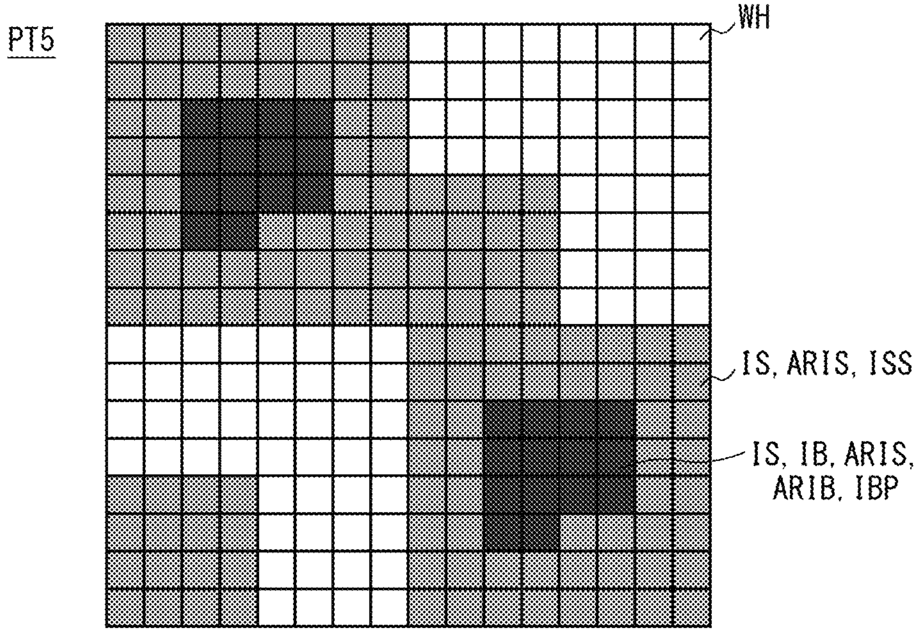
FIG. 9 is an enlarged view illustrating a print pattern PT5.

By contrast, when the image formation apparatus 1 receives the print data of only the silver developer, only the silver developer image IS formed of the silver developer is not formed on the sheet P but the silver developer image IS formed of the silver developer and the black developer image IB formed of the black developer are formed as in the print pattern PT2 (FIG. 6), the print pattern PT3 (FIG. 7), the print pattern PT4 (FIG. 8) or the print pattern PT5 (FIG. 9).

Hence, while the image formation apparatus 1 is suppressing the silver developer formed amount on the medium to suppress a decrease in the FI value, the image formation apparatus 1 uses the black developer image IB to be able to compensate for the luminous reflectance difference ΔY. In this way, even in a state where the silver developer formed amount on the medium is low, the image formation apparatus 1 can obtain the printed product of silver in which both a high glitter (FI value) and a high color tone (luminous reflectance difference ΔY) are achieved. Therefore, the image formation apparatus 1 can achieve both the metallic luster (FI value) and the color tone (luminous reflectance difference ΔY) of the image.

Here, when the image formation apparatus 1 performs printing using the silver developer which is the glitter developer, a printed product having a high glitter can be obtained but when printing is repeated, the glitter of the silver developer tends to be increased. Hence, each time printing is repeated, the glitter of the silver printed product tends to be increased little by little.

This phenomenon is considered to occur because the silver developer that includes a large amount of glitter pigment (silver pigment) and the silver developer that includes a small amount of glitter pigment are mixed due to variations in manufacturing. Since the silver developer contains a flat glitter pigment, as compared with a general color developer, large variations in particle diameter are produced. As the particle diameter of the silver developer is lower, the amount of conductive glitter pigment contained is lower, and thus the amount of charge is increased, with the result that the silver developer is easily developed. In other words, in the glitter developer, large variations in particle size distribution are produced (particle size distribution is wide), and thus as the glitter developer that is developed at the start of use of the silver developer, that is, in the beginning of printing, the silver developer of a small particle diameter that contains a small amount of glitter pigment and has low conductivity is prioritized. On the other hand, as the dot count d is increased, the ratio of the silver developer that contains a large amount of glitter pigment and has high conductivity is increased in the image formation unit 10S, with the result that the glitter developer that is developed at the end of printing before the completion of the silver developer is considered to be the silver developer of a large particle diameter that contains a large amount of glitter pigment. In other words, in the beginning of printing, the silver developer of a small particle diameter is easily developed, and at the end of printing, the silver developer of a large particle diameter is easily developed. Hence, when printing is repeated, as the silver developer is consumed, the ratio of the silver developer of a large particle diameter in the image formation unit 10S is increased. The silver developer of a large particle diameter includes a large amount of glitter pigment so as to have a high glitter. The reason why the glitter (FI value) is changed in the beginning of printing and during printing is considered to be that the particle size distribution of the glitter developer is wide.

Hence, in the electrophotographic image formation apparatus 1, for example, as compared with an image formation apparatus such as an inkjet printer that is not electrophotographic apparatus, a pressure is applied to the glitter developer to fix the glitter developer, thus the glitter of a printed product is enhanced and thereby the quality of printing can be enhanced but accordingly, the image formation apparatus 1 is easily affected by a change in the particle diameter of the glitter developer caused by the progress of use.

When as in Comparative Example 4, at all the dot counts d, printing of the print pattern PT2 (FIG. 6) with a silver developer image area occupancy ratio of 50% is performed, the amount of glitter pigment included in the glitter developer is large at the end of printing as compared with the beginning of printing but the particle diameter of the glitter developer is increased at the end of printing as compared with the beginning of printing, and thus the orientation of the glitter pigment deteriorates during fixing, with the result that the FI value is considered to be lowered. In other words, the contribution to the FI value is more significant in the lowering of the FI value caused by a large particle diameter of the glitter developer than in the enhancement of the FI value caused by a large amount of glitter pigment included in the glitter developer, and thus it is considered that as the dot count d is increased, the FI value is decreased.

On the other hand, when as in Comparative Example 1, at all the dot counts d, printing of the print pattern PT1 (FIG. 5) with a silver developer image area occupancy ratio of 100% is performed, even if the glitter developers collide with each other on the plane of the sheet during fixing and thus the orientation of the glitter pigment deteriorates, the amount of glitter pigment included in the glitter developer at the end of printing is large, with the result that the FI value is considered to be enhanced. In other words, the contribution to the FI value is more significant in the enhancement of the FI value caused by a large amount of glitter pigment included in the glitter developer than in the lowering of the FI value caused by a large particle diameter of the glitter developer, and thus it is considered that as the dot count d is increased, the FI value is considered to be enhanced.

By contrast, in the image formation apparatus 1, when the dot count d of the image formation unit 10S is equal to or greater than 0 and less than 4096 k (that is, when the remaining amount of silver developer in the developer storage space 31 of the image formation unit 10S is the first remaining amount), printing of the print pattern PT2 or PT4 with a silver developer image area occupancy ratio of 50% serving as the first area ratio is performed. In the image formation apparatus 1, when the dot count d of the image formation unit 10S reaches 4096 k counts (that is, when the remaining amount of silver developer in the developer storage space 31 of the image formation unit 10S is the second remaining amount less than the first remaining amount), printing of the print pattern PT3 or PT5 with a silver developer image area occupancy ratio of 62.5% serving as the second area ratio greater than the first area ratio is performed, and thereafter, even when the dot count d is increased, printing of the print pattern PT3 or PT5 with the silver developer image area occupancy ratio being the second area ratio is performed. In other words, in the image formation apparatus 1, when the remaining amount of silver developer in the developer storage space 31 of the image formation unit 10S is decreased (that is, when the cumulative amount of silver developer used is increased), the silver developer image area occupancy ratio of the print pattern PT is increased.

Hence, in the image formation apparatus 1, even when the remaining amount of silver developer is decreased, it is possible to suppress an increase in metallic luster. In this way, in the image formation apparatus 1, a printed product having a stable metallic luster (FI value) can be obtained from the start of use of the silver developer in the image formation unit 10S (that is, in the beginning of printing) until the completion of the silver developer (that is, the end of printing) in which the silver developer runs out.

In addition, in the image formation apparatus 1 when the dot count d of the image formation unit 10S is equal to or greater than 0 and less than 4096 k (that is, when the remaining amount of silver developer in the developer storage space 31 of the image formation unit 10S is the first remaining amount), printing of the print pattern PT2 or PT4 with a silver developer image area occupancy ratio of 12.5% serving as the third area ratio is performed. In the image formation apparatus 1, when the dot count d of the image formation unit 10S reaches 4096 k counts (that is, when the remaining amount of silver developer in the developer storage space 31 of the image formation unit 10S is the second remaining amount less than the first remaining amount), printing of the print pattern PT3 or PT5 with a black developer image area occupancy ratio of 10.9% serving as a fourth area ratio less than the third area ratio is performed, and thereafter, even when the dot count d is increased, printing of the print pattern PT3 or PT5 with the black developer image area occupancy ratio being the fourth area ratio is performed. In other words, in the image formation apparatus 1, when the remaining amount of silver developer in the developer storage space 31 of the image formation unit 10S is decreased, the black developer image area occupancy ratio of the print pattern PT is decreased.

Hence, in the image formation apparatus 1, when the remaining amount of silver developer is decreased, an increase in the luminous reflectance difference ΔY caused by increasing the silver developer image area occupancy ratio of the print pattern PT is suppressed, and thus the luminous reflectance difference ΔY can be made to fall in a range equal to or greater than 30 and equal to or less than 36. Hence, in the image formation apparatus 1, even when the remaining amount of silver developer is decreased, an increase in metallic luster can be suppressed, and moreover, an increase in color tone can be suppressed. In this way, in the image formation apparatus 1, a printed product having a stable metallic luster (FI value) and a stable color tone (the grayness, the density and the luminous reflectance difference ΔY) can be obtained from the start of use of the silver developer in the image formation unit 10S (that is, in the beginning of printing) until the completion of the silver developer (that is, the end of printing).

Furthermore, in the image formation apparatus 1, 0.1744 that is the ratio (10.9%/62.5%) of the fourth area ratio (10.9%) of the black developer image area occupancy ratio to the second area ratio (62.5%) of the silver developer image area occupancy ratio is set lower than 0.25 that is the ratio (12.5%/50%) of the third area ratio (12.5%) of the black developer image area occupancy ratio to the first area ratio (50%) of the silver developer image area occupancy ratio. Hence, in the image formation apparatus 1, even when the remaining amount of silver developer is decreased, an increase in metallic luster can be suppressed, and an increase in grayness (density) can also be suppressed.

Furthermore, in the image formation apparatus 1, the third area ratio (12.5%) of the black developer image area occupancy ratio is set lower than the first area ratio (50%) of the silver developer image area occupancy ratio, and the fourth area ratio (10.9%) of the black developer image area occupancy ratio is set lower than the second area ratio (62.5%) of the silver developer image area occupancy ratio.

In other words, in the image formation apparatus 1, the silver developer image region ARIS is formed to be larger (broader) than the black developer image region ARIB. Hence, in the image formation apparatus 1, for example, as compared with a case where the silver developer image region ARIS and the black developer image region ARIB occupy the same size region, it is possible to enhance a luster (FI value).

In the configuration described above, the image formation apparatus 1 includes the storage part in which the silver developer is stored, the first image formation unit 90 that can form the silver developer image IS with the silver developer and the controller 92 that controls the operation of the first image formation unit 90 according to the print data which is received are provided, the controller 92 forms, when the glitter image is formed on the sheet P based on predetermined print data with the amount of silver developer stored in the storage part being the first remaining amount, the silver developer image IS in which the ratio of glitter image formed per unit area is the first area ratio and the controller 92 forms, when the glitter image is formed on the sheet P based on the predetermined print data with the amount of silver developer stored in the storage part being the second remaining amount less than the first remaining amount, the silver developer image IS in which the ratio of the glitter image formed per unit area is the second area ratio greater than the first area ratio.

In this way, in the image formation apparatus 1, even when the remaining amount of silver developer is decreased, an increase in metallic luster can be suppressed, and a printed product having a stable metallic luster (FI value) can be obtained from the start of use of the silver developer in the image formation unit 10S until the completion of the silver developer.

9. Other Embodiments

In one or more embodiments described above, a case has been described in which the image formation apparatus 1 prints the print pattern PT in which the silver developer image IS and the black developer image IB are combined. The invention is not limited to this case, and the image formation apparatus 1 may omit the black developer image IB, print the print pattern PT in which only the silver developer image IS is present and print, when the remaining amount of silver developer is decreased, the print pattern PT with a greater silver developer image area occupancy ratio. In this case, whether or not the black developer image IB is present has little effect on the FI value, and thus when the black developer image IB is not present in the print pattern PT, even if the remaining amount of silver developer is decreased, in the image formation apparatus 1, an increase in metallic luster can be suppressed, with the result that a printed product having a stable metallic luster (FI value) can be obtained from the start of use of the silver developer in the image formation unit 10S (that is, in the beginning of printing) until the completion of the silver developer (that is, the end of printing).

In one or more embodiments described above, a case has been described in which the image formation apparatus 1 performs printing with the print pattern PT2 (FIG. 6) or the print pattern PT4 (FIG. 8) when the silver developer image area occupancy ratio is 50% and the black developer image area occupancy ratio is 12.5%, with the print pattern PT3 (FIG. 7) or the print pattern PT5 (FIG. 9) when the silver developer image area occupancy ratio is 62.5% and the black developer image area occupancy ratio is 10.9%, with the print pattern PT6 (FIG. 10) when the silver developer image area occupancy ratio is 25% and the black developer image area occupancy ratio is 15.6%, with the print pattern PT7 (FIG. 11) when the silver developer image area occupancy ratio is 37.5% and the black developer image area occupancy ratio is 14.1% and with the print pattern PT8 (FIG. 12) when the silver developer image area occupancy ratio is 75% and the black developer image area occupancy ratio is 9.4%. The invention is not limited to this case, and the image formation apparatus 1 may perform printing with print patterns formed with the silver developer image IS and the black developer image IB of various other shapes as long as the silver developer image area occupancy ratio and the black developer image area occupancy ratio are satisfied.

Furthermore, in one or more embodiments described above, a case has been described in which in the image formation apparatus 1, the white region WH in the print patterns PT (FIG. 6 to FIG. 12) is the region where no developer image is formed. The invention is not limited to this case, and in the image formation apparatus 1, the white region WH may be a region where the developer image of white is formed.

Furthermore, in one or more embodiments described above, a case has been described in which the image formation apparatus 1 forms the black developer image IB with only the black developer. The invention is not limited to this case, and the image formation apparatus 1 may combine, as developers of different colors, a yellow developer, a magenta developer and a cyan developer serving as non-glitter developers so as to form a black developer image formed of process black. In such a case, the second image formation unit 91 (FIG. 17) corresponds to the image formation units 10C, 10M and 10Y (FIG. 1). A yellow developer, a magenta developer, a cyan developer and a black developer serving as non-glitter developers may be combined to form a black developer image formed of process black. In such a case, the second image formation unit 91 (FIG. 17) corresponds to the image formation units 10C, 10M, 10Y and 10K (FIG. 1).

Furthermore, in one or more embodiments described above, a case has been described in which the image formation apparatus 1 uses the black developer to which carbon black is added. The invention is not limited to this case, and the image formation apparatus 1 may use, as the black developer, a gray developer in which the amount of carbon black added is reduced as compared with the black developer or may use, as the black developer, a gray developer in which carbon black and white titanium oxide are mixed.

Furthermore, in one or more embodiments described above, a case has been described in which in the image formation apparatus 1, aluminum (AI) included in the glitter pigment used when the developer is generated is a minute flake having a planar part. The invention is not limited to this case, and the image formation apparatus 1 may use aluminum (AI) included in the glitter pigment that is formed with small pieces of various shapes such as a spherical shape and a rod shape.

Furthermore, in one or more embodiments described above, a case has been described in which in the image formation apparatus 1, a metal included in the glitter pigment used when the developer is generated is aluminum (AI). The invention is not limited to this case, and in the image formation apparatus 1, the metal included in the glitter pigment used when the developer is generated may be various metals such as brass and iron oxide. In this case, the color of the developer when the developer is fixed on the sheet P is the color that corresponds to this metal. In addition, the glitter pigment is not limited to the glitter pigment including aluminum (AI), and various other pigments having glittering properties may be used, such as pearl pigments (natural mica) and inorganic pigments including titanium oxide.

In one or more embodiments described above, a case has been described in which in the image formation apparatus 1, as an example of the glitter developer, the silver developer is used, and thus metallic color expressivity is evaluated. The invention is not limited to this case, and in the image formation apparatus 1, as an example of the glitter developer, a gold developer may be used. In such a case, the gold developer is preferably produced by the following manufacturing method. In one or more embodiments described above, as the glitter pigment, aluminum is added during manufacturing, and thus the silver developer is produced. However, here, a yellow pigment (here, as an organic pigment, C. I. Pigment Yellow 180), a magenta pigment (here, as an organic pigment, C. I. Pigment Red 122), a red-orange fluorescent dye (FM-34N_Orange made by SINLOIHI Company, Limited) and a yellow fluorescent dye (FM-35N_Yellow made by SINLOIHI Company, Limited) are added, and thus the gold developer is manufactured. Since the glitter pigment is added to the gold developer as described above, as in the silver developer described above, each time printing is repeated, the glitter is increased little by little. Hence, when in the image formation apparatus 1, the gold developer and the yellow developer are combined, and thus the same control as the control described above is performed, the same effects can be obtained.

Furthermore, in one or more embodiments described above, a case has been described in which in the image formation apparatus 1, the CPU 23 serving as a detector or a detection section is used to detect, based on the dot count d of the image formation unit 10S, the remaining amount of silver developer in the image formation unit 10S. The invention is not limited to this case, and in the image formation apparatus 1, the CPU 23 serving as a detector or a detection section may be used to detect, based on the result of detection performed by a developer remaining amount detection bar provided in the developer storage space 31, the remaining amount of silver developer in the image formation unit 10S.

Furthermore, in one or more embodiments described above, a case has been described in which the invention is applied to the image formation apparatus 1 that forms the image with the developer used in the one-component development method. The invention is not limited to this case, and the invention may be applied to an image formation apparatus that forms an image with a developer used in a two-component development method in which a carrier and a toner is mixed and an appropriate amount of charge is provided to the toner by utilization of friction between the carrier and the toner. Specifically, in the case of the two-component development method, the glitter developer including an external additive in addition to the glitter toner and the carrier are stored in the developer container 12 and the developer storage space 31. Even in the two-component development method, when large variations in the particle size distribution of the glitter developer are produced (particle size distribution is wide), in the beginning of printing, the glitter developer of a small particle diameter having low conductivity is preferentially consumed, and thus when printing is repeated, the ratio of the glitter developer of a large particle diameter in the developer storage space 31 is increased. For example, as compared with a ratio of the glitter developer of a large particle diameter to all the glitter developer in the developer storage space 31 when the glitter developer is supplied zero times from the developer container 12 to the developer storage space 31, a ratio of the glitter developer of a large particle diameter to all the glitter developer in the developer storage space 31 when the glitter developer is supplied 10 times is great. This is because since the glitter developer of a small particle diameter is preferentially consumed, as the number of times the glitter developer is supplied is increased, the remaining amount of glitter developer of a large particle diameter in the developer storage space 31 is increased. Hence, regardless of the remaining amount of carrier in the developer storage space 31, in the glitter developer of the two-component development method, as the remaining amount of glitter developer in the developer storage space 31 is decreased, the invention is applied, with the result that the same effects can be obtained.

Furthermore, in one or more embodiments described above, a case has been described in which the invention is applied to the image formation apparatus 1 of a so-called intermediate transfer method (or a secondary transfer method) in which the developer images of individual colors are sequentially transferred from the photosensitive drums 36 of the image formation units 10 to the intermediate transfer belt 44 so as to overlap each other and the developer images are transferred from the intermediate transfer belt 44 to the sheet P. The invention is not limited to this case, and the invention may be applied to an image formation apparatus of a so-called direct transfer method in which developer images of individual colors are sequentially transferred from the photosensitive drums 36 of the image formation units 10 to the sheet P serving as a medium so as to overlap each other. In the case of the image formation apparatus 1 of the intermediate transfer method in an embodiment, the image formation apparatus 1 includes the primary transfer rollers 45 serving as the transfer part for transferring the developer images on the photosensitive drums 36 to the intermediate transfer belt 44 serving as a medium and the secondary transfer roller 46 serving as the transfer part for transferring the developer images on the intermediate transfer belt 44 to the sheet P serving as a medium. On the other hand, in the case of the image formation apparatus of the direct transfer method, the image formation apparatus includes only transfer rollers serving as a transfer part for transferring developers on photosensitive drums to a sheet serving as a medium.

Furthermore, in one or more embodiments described above, a case has been described in which the invention is applied to the image formation apparatus 1 that includes the five image formation units 10. The invention is not limited to this case, and the invention may be applied to an image formation apparatus that includes four or less or 6 or more image formation units 10.

Furthermore, in one or more embodiments described above, a case has been described in which the invention is applied to the image formation apparatus 1 that includes the image formation unit 10 in which the developer container 12 is detachable from the image formation main body unit 11. The invention is not limited to this case, and the invention may be applied to an image formation apparatus that includes an image formation unit in which the developer container 12 is integral with the image formation main body unit 11.

Furthermore, in one or more embodiments described above, a case has been described in which when the print data of the color of silver 100% is received from the external apparatus 20, the image formation apparatus 1 selects, based on the special color silver dedicated data conversion table 88, according to the dot count d of the image formation unit 10S, any one of the print pattern PT2 (FIG. 6), the print pattern PT3 (FIG. 7), the print pattern PT4 (FIG. 8) and the print pattern PT5 (FIG. 9) and performs printing. The invention is not limited to this case, and when the external apparatus 20 acquires print data of the color of silver 100% on a printer driver from an application, the external apparatus 20 may acquire data of the dot count d of the image formation unit 10S or the data of the remaining amount of silver developer in the developer storage space 31 from the image formation apparatus 1, reference a predetermined special color silver dedicated data conversion table based on the acquired data, select any one of the print pattern PT2 (FIG. 6), the print pattern PT3 (FIG. 7), the print pattern PT4 (FIG. 8) and the print pattern PT5 (FIG. 9) and transmit the selected print pattern to the image formation apparatus 1. In such a case, the image formation apparatus 1 prints the print pattern PT received from the external apparatus 20 without processing the print pattern PT.

Furthermore, in one or more embodiments described above, a case has been described in which the invention is applied to the image formation apparatus 1 that is a single function printer. The invention is not limited to this case, and the invention may be applied to an image formation apparatus, such as an MFP (Multi-Functional Peripheral) having the functions of a copying machine and a facsimile device, that has various other functions.

Furthermore, in one or more embodiments described above, a case has been described in which the invention is applied to the image formation apparatus 1. The invention is not limited to this case, and the invention may be applied to various electronic devices, such as a copying machine, that uses an electrophotographic method to form an image on a medium such as the sheet P with a developer.

Furthermore, the invention is not limited to the embodiments and the other embodiments described above. In other words, the invention is also applied to embodiments obtained by arbitrarily combining part or all of the embodiments and the other embodiments described above. The invention is also applied to embodiments obtained by extracting part of the configuration of any one of the embodiments and the other embodiments described above and replacing part of the configuration of any one of the embodiments and the other embodiments described above with the extracted part and to embodiments obtained by adding the extracted part of the configuration to any one of the embodiments.

Furthermore, in one or more embodiments described above, a case has been described in which the image formation apparatus 1 serving as an image formation apparatus includes the first image formation unit 90 serving as a first image formation unit and the controller 92 serving as a controller. The invention is not limited to this case, and an image formation apparatus may include a controller and a first image formation unit having various other configurations.

INDUSTRIAL APPLICABILITY

The disclosure can be utilized for a case where an electrophotographic method is used to form an image on a medium with a developer including a metal pigment.

The invention claimed is:

1. An image formation apparatus comprising:

a first image formation unit including a storage part in which a glitter developer is stored and configured to form a glitter developer image with the glitter developer; and a detector configured to detect an amount of the glitter developer stored in the storage part, a controller configured to control an operation of the first image formation unit according to print data received, wherein the controller is configured to perform operations comprising operations to control, upon forming a glitter image on a medium based on predetermined print data when the amount of the glitter developer stored in the storage part is a first remaining amount, the first image formation unit to form the glitter developer image in which a ratio of the glitter image formed per unit area is a first area ratio, and control, upon forming the glitter image on the medium based on the predetermined print data when the amount of the glitter developer stored in the storage part is a second remaining amount less than the first remaining amount, the first image formation unit to form the glitter developer image in which the ratio of the glitter image formed per unit area is a second area ratio greater than the first area ratio.

2. The image formation apparatus according to claim 1, further comprising:

a second image formation unit that includes at least one or more image formation units and one of the one or more image formation units is configured to form a black developer image with black developer, wherein the controller is configured to perform operations further comprising operations to control operations of the first image formation unit and the second image formation unit according to the print data received, control, upon forming the glitter image on the medium based on the predetermined print data when the amount of the glitter developer stored in the storage part is the first remaining amount, the first image formation unit and the second image formation unit to form the glitter developer image in which the ratio of the glitter image formed per unit area is the first area ratio and the black developer image in which the ratio of the black developer image formed per unit area is a third area ratio, and control, upon forming the glitter image on the medium based on the predetermined print data when the amount of the glitter developer stored in the storage part is the second remaining amount, the first image formation unit and the second image formation unit to form the glitter developer image in which the ratio of the glitter image formed per unit area is the second area ratio and the black developer image in which the ratio of the black developer image formed per unit area is a fourth area ratio less than the third area ratio.

3. The image formation apparatus according to claim 2, wherein the controller is configured to set the third area ratio smaller than the first area ratio.

4. The image formation apparatus according to claim 2, wherein the controller is configured to form the black developer image between the glitter developer image and the medium.

5. The image formation apparatus according to claim 2, wherein the controller is configured to form the black developer image outside a formation region of the glitter developer image.

6. The image formation apparatus according to claim 5, wherein the controller is configured to form a region where no developer image is formed between a region of the glitter developer image and a region of the black developer image.

7. The image formation apparatus according to claim 5, wherein the at least one or more image formation units of the second image formation unit includes a white image formation unit configured to form a white developer image with white developer, and the controller is configured to perform operations further comprising operations to control the white image formation unit to form a region of the white developer image between a region of the glitter developer image and a region of the black developer image.

8. The image formation apparatus according to claim 2, wherein the second image formation unit comprises an image formation unit configured to form the black developer image with the black developer.

9. The image formation apparatus according to claim 2, wherein the second image formation unit further comprises three image formation units configured to respectively form a yellow developer image, a magenta developer image and a cyan developer image.

10. The image formation apparatus according to claim 1, further comprising:

a second image formation unit that includes at least one or more image formation units and one of the one or more image formation units is configured to form a black developer image with black developer, wherein the controller is configured to perform operations further comprising operations to control operations of the first image formation unit and the second image formation unit according to the print data received, control, upon forming the glitter image on the medium based on the predetermined print data when the amount of the glitter developer stored in the storage part is the first remaining amount, the first image formation unit and the second image formation unit to form the glitter developer image in which the ratio of the glitter image formed per unit area is the first area ratio and the black developer image in which the ratio of the black developer image formed per unit area is a third area ratio, and control, upon forming the glitter image on the medium based on the predetermined print data when the amount of the glitter developer stored in the storage part is the second remaining amount, the first image formation unit and the second image formation unit to form the glitter developer image in which the ratio of the glitter image formed per unit area is the second area ratio and the black developer image in which the ratio of the black developer image formed per unit area is a fourth area ratio, and a ratio of the fourth area ratio to the second area ratio is smaller than a ratio of the third area ratio to the first area ratio.

11. The image formation apparatus according to claim 10, wherein the controller is configured to decrease the third area ratio with respect to the first area ratio.

12. The image formation apparatus according to claim 10, wherein the controller is configured to form the black developer image between the glitter developer image and the medium.

13. The image formation apparatus according to claim 10, wherein the controller is configured to form the black developer image outside a region where the glitter developer image is formed.

14. The image formation apparatus according to claim 13, wherein the controller is configured to form a region where no developer image is formed between a region of the glitter developer image and a region of the black developer image.

15. The image formation apparatus according to claim 13, wherein the at least one or more image formation units of the second image formation unit includes a white image formation unit configured to form a white developer image with white developer, and the controller is configured to perform operations further comprising operations to control the white image formation unit to form a region of the white developer image between a region of the glitter developer image and a region of the black developer image.

16. The image formation apparatus according to claim 10, wherein the second image formation unit comprises an image formation unit configured to form the black developer image with the black developer.

17. The image formation apparatus according to claim 10, wherein the second image formation unit further comprises three image formation units configured to respectively form a yellow developer image, a magenta developer image and a cyan developer image.

18. The image formation apparatus according to claim 1, wherein the controller is configured to control the operation of the first image formation unit based on the first remaining amount and the second remaining amount detected by the detector.

19. The image formation apparatus according to claim 1, wherein the detector is configured to detect the amount of the glitter developer stored in the storage part of the first image formation unit, based on a total number of dots used to form the glitter developer image by the first image formation unit.

20. The image formation apparatus according to claim 1, wherein the detector is configured to detect the amount of the glitter developer stored in the storage part in the first image formation unit, based on a detection result from a detection bar provided in the storage part.

* * * * *